US012570051B2

(12) United States Patent
    Huang

(10) Patent No.: US 12,570,051 B2
(45) Date of Patent: Mar. 10, 2026

(54) CONVOLUTION MODELING AND LEARNING SYSTEM FOR PREDICTING GEOMETRIC SHAPE ACCURACY OF 3D PRINTED PRODUCTS

(71) Applicant: UNIVERSITY OF SOUTHERN CALIFORNIA, Los Angeles, CA (US)

(72) Inventor: Qiang Huang, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 296 days.

(21) Appl. No.: 18/028,946

(22) PCT Filed: Sep. 27, 2021

(86) PCT No.: PCT/US2021/052256
     § 371 (c)(1),
     (2) Date: Mar. 28, 2023

(87) PCT Pub. No.: WO2022/067211
     PCT Pub. Date: Mar. 31, 2022

(65) Prior Publication Data
     US 2023/0339185 A1      Oct. 26, 2023

Related U.S. Application Data

(60) Provisional application No. 63/084,196, filed on Sep. 28, 2020.

(51) Int. Cl.
     B29C 64/386      (2017.01)
     G05B 19/4099     (2006.01)
     (Continued)

(52) U.S. Cl.
     CPC ........ B29C 64/386 (2017.08); G05B 19/4099 (2013.01); B33Y 50/00 (2014.12); G05B 2219/49026 (2013.01)

(58) Field of Classification Search
     CPC ............. B29C 64/386; G05B 19/4099; G05B 2219/49026; B33Y 50/00; B33Y 50/02; B22F 10/85
     (Continued)

(56) References Cited

U.S. PATENT DOCUMENTS

| | | | |
|---|---|---|---|
| 2016/0046076 A1* | 2/2016 | Huang | B29C 64/129 700/98 |
| 2018/0095450 A1* | 4/2018 | Lappas | B33Y 10/00 |
| 2020/0242495 A1 | 7/2020 | Roychowdhury et al. | |

OTHER PUBLICATIONS

International Search Report and Written Opinion (mailing date Jan. 11, 2022) for International PCT Patent Application No. PCT/US 2021/52256, filed Sep. 27, 2021.

* cited by examiner

*Primary Examiner* — Michael J Brown
(74) *Attorney, Agent, or Firm* — Snell & Wilmer LLP

(57)                ABSTRACT

A system, method, and computer-readable medium having machine instructions provides for predicting geometric shape accuracy of 3D printed products. Such a prediction may involve developing a model of an object and determining ways in which an actually-manufactured 3D object corresponding to the model differs in real life. These differences correspond to shape deviations. Shape deviations may be process dependent and/or path dependent, and different layers of the object as well as the manufacturing process to make the different layers may introduce shape deviations in layers of the object. By developing a transfer functions of the manufacturing process and associated interlayer effects of the layers and then appropriately offsetting inputs to the manufacturing process, the shape deviations may be ameliorated.

19 Claims, 22 Drawing Sheets

(51) Int. Cl.
　　*B22F 10/85*　　　(2021.01)
　　*B33Y 50/00*　　　(2015.01)
　　*B33Y 50/02*　　　(2015.01)
(58) Field of Classification Search
　　USPC ........................................................ 700/98
　　See application file for complete search history.

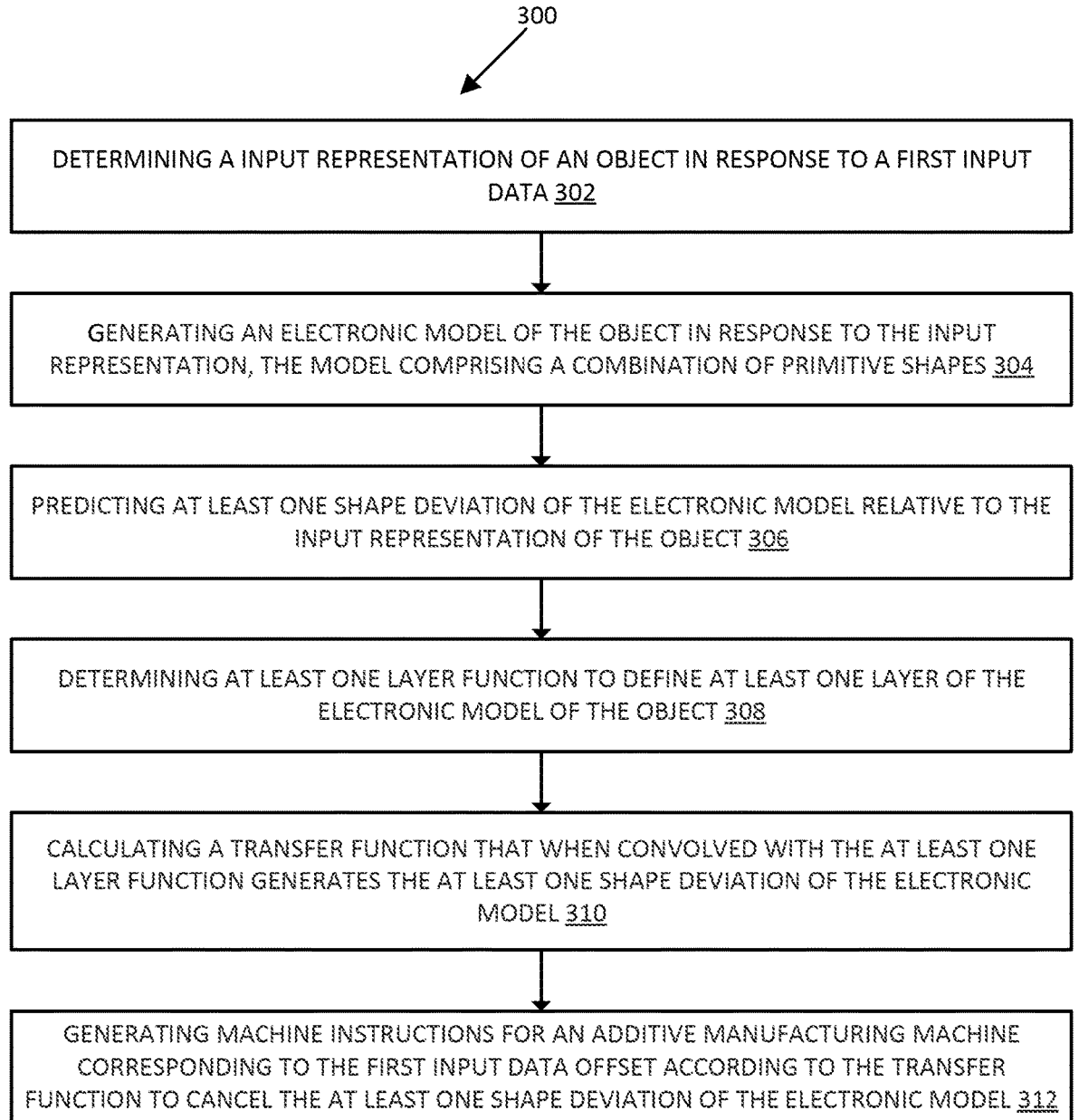

300

DETERMINING A INPUT REPRESENTATION OF AN OBJECT IN RESPONSE TO A FIRST INPUT DATA 302

GENERATING AN ELECTRONIC MODEL OF THE OBJECT IN RESPONSE TO THE INPUT REPRESENTATION, THE MODEL COMPRISING A COMBINATION OF PRIMITIVE SHAPES 304

PREDICTING AT LEAST ONE SHAPE DEVIATION OF THE ELECTRONIC MODEL RELATIVE TO THE INPUT REPRESENTATION OF THE OBJECT 306

DETERMINING AT LEAST ONE LAYER FUNCTION TO DEFINE AT LEAST ONE LAYER OF THE ELECTRONIC MODEL OF THE OBJECT 308

CALCULATING A TRANSFER FUNCTION THAT WHEN CONVOLVED WITH THE AT LEAST ONE LAYER FUNCTION GENERATES THE AT LEAST ONE SHAPE DEVIATION OF THE ELECTRONIC MODEL 310

GENERATING MACHINE INSTRUCTIONS FOR AN ADDITIVE MANUFACTURING MACHINE CORRESPONDING TO THE FIRST INPUT DATA OFFSET ACCORDING TO THE TRANSFER FUNCTION TO CANCEL THE AT LEAST ONE SHAPE DEVIATION OF THE ELECTRONIC MODEL 312

FIG. 3A

NORMALIZING TRANSFER FUNCTION (G(X)) AND LAYER FUNCTION (F(X)) 352

COLLECTING TEST DATA 354

DEVELOPING SDG MODELS 356

EXECUTING A PHYSICS-INFORMED SEQUENTIAL MODEL REFINEMENT ROUTINE 358

358

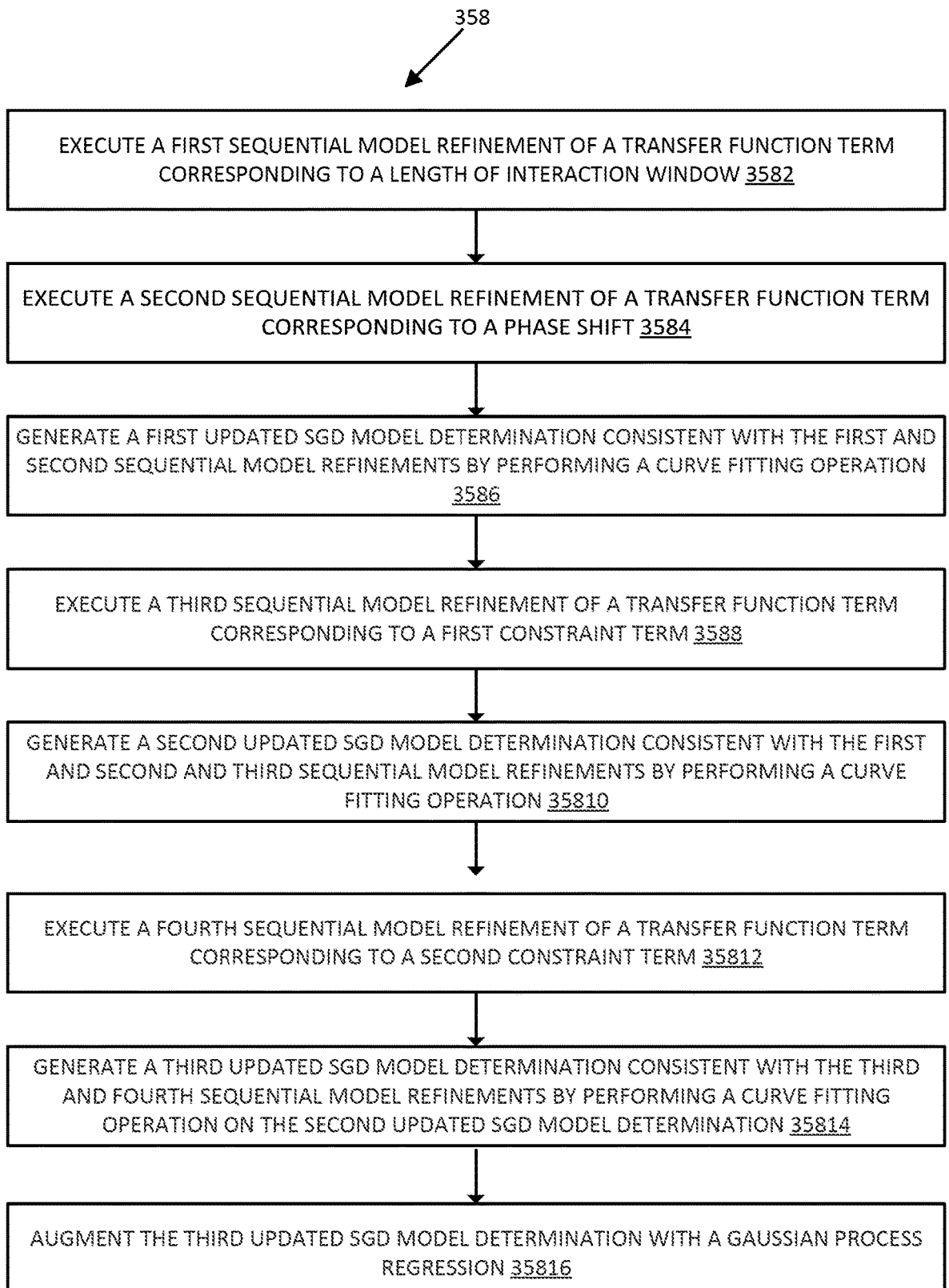

EXECUTE A FIRST SEQUENTIAL MODEL REFINEMENT OF A TRANSFER FUNCTION TERM CORRESPONDING TO A LENGTH OF INTERACTION WINDOW 3582

EXECUTE A SECOND SEQUENTIAL MODEL REFINEMENT OF A TRANSFER FUNCTION TERM CORRESPONDING TO A PHASE SHIFT 3584

GENERATE A FIRST UPDATED SGD MODEL DETERMINATION CONSISTENT WITH THE FIRST AND SECOND SEQUENTIAL MODEL REFINEMENTS BY PERFORMING A CURVE FITTING OPERATION 3586

EXECUTE A THIRD SEQUENTIAL MODEL REFINEMENT OF A TRANSFER FUNCTION TERM CORRESPONDING TO A FIRST CONSTRAINT TERM 3588

GENERATE A SECOND UPDATED SGD MODEL DETERMINATION CONSISTENT WITH THE FIRST AND SECOND AND THIRD SEQUENTIAL MODEL REFINEMENTS BY PERFORMING A CURVE FITTING OPERATION 35810

EXECUTE A FOURTH SEQUENTIAL MODEL REFINEMENT OF A TRANSFER FUNCTION TERM CORRESPONDING TO A SECOND CONSTRAINT TERM 35812

GENERATE A THIRD UPDATED SGD MODEL DETERMINATION CONSISTENT WITH THE THIRD AND FOURTH SEQUENTIAL MODEL REFINEMENTS BY PERFORMING A CURVE FITTING OPERATION ON THE SECOND UPDATED SGD MODEL DETERMINATION 35814

AUGMENT THE THIRD UPDATED SGD MODEL DETERMINATION WITH A GAUSSIAN PROCESS REGRESSION 35816

3 inches 1 inch

410

502

904

CONVOLUTION MODELING AND LEARNING SYSTEM FOR PREDICTING GEOMETRIC SHAPE ACCURACY OF 3D PRINTED PRODUCTS

CROSS-REFERENCE TO RELATED APPLICATIONS

This application is based upon and claims priority to U.S. provisional patent application 63/084,196 entitled "CONVOLUTION MODELING AND LEARNING SYSTEM FOR PREDICTING GEOMETRIC SHAPE ACCURACY OF 3D PRINTED PRODUCTS" and filed Sep. 28, 2020, the entire content of which is incorporated herein by reference.

GOVERNMENT LICENSE RIGHTS

This invention was made with United States government support under Contract No. NSF CMMI-1544917 by the National Science Foundation. The United States government has certain rights in this invention.

BACKGROUND

1. Field

The present disclosure is directed to systems and methods for predicting geometric shape accuracy of additively manufactured products, and more specifically, for generating representative transfer functions.

2. Description of the Related Art

3-D shape accuracy is a critical performance measure for products built via additive manufacturing (AM). Physics-based modeling and simulation approaches present voxel-level description of an object formation from points to lines, lines to surfaces, and surfaces to 3-D shapes. However, this computationally intensive modeling framework does not provide a clear structure for machine learning of AM data.

Moreover, AM introduces process and path dependencies that effect 3-D shape accuracy. For instance, the temperature field, melt pool geometry, and cooling and reheating cycle that occurs as additional material is added to an incompletely manufactured article causes swelling, shrinkage, delamination, and other changes during the manufacturing process that causes inaccuracies in the finished product.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

FIG. 3A illustrates an example method for predicting geometric shape accuracy of 3D printed products, in accordance with various embodiments;

FIG. 3C illustrates an example method of developing models which may be performed as an aspect of model-informed estimation consistent with FIG. 3B, in accordance with various embodiments;

SUMMARY

Figure 1:
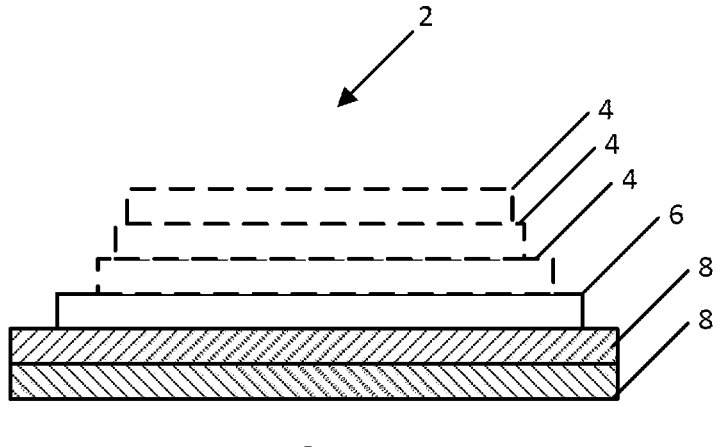
FIG. 1 depicts an additively-manufactured 3D object constructed layer by layer, in accordance with various embodiments.

A system, method, and computer readable medium (collectively, "system") for predicting geometric shape accuracy of 3D printed products is provided. In various instances, the system may include a non-transitory computer-readable memory configured to store instructions and one or more processors.

In various instances, the one or more processor may be configured to execute methods. The one or more processor may be configured to execute methods responsive to instructions on non-transitory computer readable media. For instance, the one or more processor may be configured to determine an input representation of an object in response to a first data input. The one or more processor may be further configured to generate an electronic model of the object in response to the input representation and predict a shape deviation of the electronic model relative to the input representation of the object. The one or more processor may be configured to determine at least one layer function to define at least one layer of the electronic model of the object. Finally, the one or more processor may be configured to calculate a transfer function that, when convolved with the at least one layer function, generates the at least one shape deviation of the electronic model.

In various embodiments, the one or more processor is further configured to generate machine control instructions for an additive manufacturing machine corresponding to the first input data, offset according to the transfer function, to cancel the at least one shape deviation from the electronic model. Moreover, the electronic model of the object may include a combination of primitive shapes.

The one or more processor may be configured to learn the transfer function in various ways. For instance, machine learning techniques may be implemented. In further examples, Fourier bases may be utilized.

The one or more processor that is configured to calculate the transfer function may also be configured to, as an aspect of calculating the transfer function, perform a model-informed estimation approach wherein an initially determined model is refined by a maximum likelihood estimation corresponding to a length of interaction window interrelating at least two layers of the electronic model of the object.

The one or more processor that is configured to calculate the transfer function may also be configured to, as an aspect of calculating the transfer function, execute a Gaussian process regression (GPR) to generate a GPR-augmented electronic model of the object.

DETAILED DESCRIPTION

As disclosed herein, systems, methods, and computer-readable media are provided to enhance the accuracy of additive manufacturing. For instance, a convolution modeling and learning framework for prediction geometric shape accuracy of 3D printed products, and systems and methods thereof are described herein. The techniques described in U.S. Pat. No. 9,886,526 entitled "3D Printing Shrinkage Compensation Using Radial and Angular Layer Perimeter Point Information," granted on Feb. 6, 2018 and U.S. Pat. No. 9,827,717 entitled "Statistical Predictive Modeling and Compensation of Geometric Deviations of 3D Printed Products," granted on Nov. 28, 2017, are incorporated by reference herein.

This disclosure includes systems and methods for predicting geometric shape accuracy of additively manufactured products, and more specifically, for generating representative transfer functions to stack up 2-D layers into 3-D objects. The disclosure described herein use a novel 3D shape deviation model with a convolution formulation to model and learn the 3D shape generation process and its deviations. A data-analytical framework enables machine learning of measurement data of 3D printed products.

With reference to FIG. 1, an additive manufacturing (AM) process frequently builds 3D objects 2 layer by layer. While the shape of a 3D object can be highly complex and arbitrary, a 3D object can be represented as a set of stacked layers in 2D shapes. The 2D shapes may be termed primitives or primitive shapes. For instance, a dome could be represented as a set of stacked circles of decreasing radius. FIG. 1 shows a 3D object 2 made of a stack of already manufactured layers 8, a layer under current manufacturing 6, and yet-to-be manufactured layers 4.

In a layer-by-layer shape formation process, data corresponding to shapes of individual layers may be considered to be inputs to a system having a transfer function and the actually-manufactured individual layers of the additively manufactured object may be considered to be outputs of the system having the transfer function. The outputs differ from the inputs consistent with errors introduced by physical limitations and processes associated with manufacturing of a layer under present manufacturing.

However, the outputs also differ from the inputs consistent with errors introduced by physical limitations and processes associated with manufacturing of other layers, such as earlier-manufactured layers, and later-manufactured layers. For instance, each layer 4, when manufactured, will differ from the initial electronic model of each layer 4, according to various errors. The magnitude and direction of each physical deviation from the electronic model is dependent on many factors, including aspects of previously-manufactured layers 8. Similarly, previously-manufactured layers 8 may be changed dimensionally due to the process effects during the manufacturing of yet-to-be manufactured layers 4. Moreover, the nature of these errors may vary with the geometry of the earlier and/or later-manufactured layers, as well as with the size of the layer under present manufacturing 6, and/or the earlier and/or later-manufactured layers. Thus, the transfer function of any layer may be path-dependent, meaning the transfer function changes according to errors introduced by earlier-manufactured layers or later-manufactured layers which may heat, cool, press-upon, or otherwise alter a layer. Moreover, the transfer function of any layer may be process-dependent, meaning the transfer function changes according to errors introduced by physical properties of the materials, tools, and techniques of the AM process.

In some instances, large layers, or layers manufactured later in a process may be exposed to different heating or cooling processes due to the changing thermal mass of an object during manufacture. Similarly, small layers beneath large layers may experience different bending effects due to the changing mass and changing mass distribution of an object during manufacture. In various embodiments, complex combinations of heat exchange and thermal or mechanical stresses within and between layers causes complex path and process dependent changes in the dimensions of the AM object.

Layer buildup along a z-direction incurs interlayer interactions. For instance, complete interlayer bonding implies full density and continuous interface between successively fabricated layers, while poor bonding may cause delamination and defects, such as balling or beading across a layer. Different AM processes and AM materials exhibit different effects, such as a heat accumulation effect and/or a remelting phenomenon due to laser energy penetration that may increase temperature and size of melt pools when a laser beam moves from bottom to top layers.

As a consequence of these path and process dependencies, a transfer function for a layer does not only process data associated with an input layer at the current layer under manufacturing, but also processes input data associated with other layers. As such, one may conceptualize both a "time shift" and an "accumulation" effect within the transfer function. For convenience, a convolution integral will be referenced herein to accommodate both such effects, however, one may appreciate that other effects are contemplated and are readily addressed by the framework discussed herein with reference to convolution, and that other mathematical processes and techniques are contemplated.

In various instances, a formula may be derived, where a layer function to manufacture a layer, convolved with a transfer function for the manufacturing of that layer, may represent a shape deviation. Moreover, an AM process may be described with state-space equations, where a first equation provides a state vector of each layer and another equation provides a system response to each layer. By solving the state-space equation through a Laplace transform, defining a transfer function, and conducting an inverse Laplace transform, one may appreciate that again, a convolution formula is derived. Thus, one may also appreciate that while convolution is referenced herein as a way to readily emphasis both the time shifting and accumulation concepts, other mathematical frameworks may accurately describe aspects of the disclosure encompassed herein.

Generally, at least two categories of shape deviation errors may be contemplated. A global summary error, such as overall size distortion that causes a whole shape deviation or volumetric shrinkage may be contemplated. A feature error, such as the distortion of a specific geometric feature of a shape, may also be contemplated. As such, one may appreciate that there are multiple ways to describe the deviations that may occur. For instance, a system may calculate a pointwise deviation, a point cloud and associated transformations, a mesh and associated deviations, and/or the like.

However, systems and methods herein advantageously decouple a geometric shape complexity from modeling a system response (e.g., transfer function associated with shape deviation) and in this manner, facilitate improved accuracy and precision for manufacturing of arbitrary objects. Moreover, both continuous and discontinuous shape representations may be contemplated. For instance, a shape may be represented by perceptually important features such as point sets, curves, surfaces, level sets, deformable templates, or general contour representations. Shape representations may be contemplated such as a feature vector derived from an integral boundary (e.g., the Fourier descriptors). In further instances, discontinuous shape representations may include a discrete approach breaking a shape boundary into segments for approximation. Representing a shape as diffeomorphism of the unit circle to itself through conformal mapping is one mechanism for shape classification. Further representations may include medial and skeletal representation, deformable templates, geometric descriptors and/or the like. Importantly however, descriptor taxonomy may be variable from embodiment to embodiment within the framework of the system provided herein.

Thus, in various instances, a transfer function g(x) in a convolution formulation may provide a data-analytical description on the effect of interlayer interactions and error accumulations. As such, a convolution for a system may be, generally:

$$y(x)=(f*g)(x)+E \qquad \text{Eq. (1)}$$

where y(x) represents the shape deviation (1D curves or 2D surfaces for 2D or 3D shapes, respectively), x are parameters that describe the shape deviation, and E is the model error term with $E \sim N(0, \sigma 2)$.

In addition, two boundary conditions are defined to satisfy practical engineering constraints. Specifically:

B1. If $x=r(\theta,\phi) \to 0$, $y(x) \to 0$. If the size of a built part tends to zero, the shape deviation approaches to zero as well. The system defined in Eq. (1) is thereibre a linear causal system.

B2. If $x=0) \to \infty$, $y(x)$ is bounded. Even if the size of the built part tends to infinity or very large, the shape deviation of the part may be bounded or approaches to a constant because of physical constraints on the materials and process.

Another way to conceptualize the additive manufacturing process is (as previously mentioned) state space equations with the time index k being the layer index:

$$x(k)=Ax(k-1)+Bu(k) \qquad \text{Eq. (2)}$$

$$y(k)=Cx(k)+Du(k) \qquad \text{Eq. (3)}$$

where x(k) represents the state vector of the $k^{th}$ layer, and y(k) is the system response.

The solution to the state space equation through Laplace transformation is Y(s)=[D+C(sI−A)−1B]U(s). By defining the transfer function G(s)=D+C(sI−A)−1B and conducting inverse Laplace transformation of Y(s)=G(s)U(s), there may be derived also a convolution formulation consistent with Eq. (1).

Compared to the state space model, the convolution model has fewer unknown terms to be identified and learned. However, the state space model more readily accommodates dynamic system representation and real-time feedback control. Thus, the mathematical approach discussed with respect to convolution, may be one of multiple approaches to describe the disclosure provided for herein.

Referring more specifically to the convolution model discussed above and with reference to FIG. 2, a system 200 is provided for predicting geometric shape accuracy of 3D printed products (also called "objects" herein). The system is depicted as logical boxes representing logical aspects of a processor and/or memory, but in further embodiments, aspects, features, or capabilities of the logical boxes may be combined, or may be rearranged.

Rather than immediately describe the elements of system 200, now is a convenient time to explain a method performed by the system to provide initial context for discussing the system 200. Thus, directing attention now to the combination of FIGS. 2 and 3A, system 200 performs a method for predicting geometric shape accuracy of 3D printed products. The details of how the method is executed will be elaborated more fully with the discussion of each constituent element of system 200. Moreover, with discussion of a transfer function engine 210 of the system 200, sub-methods will be discussed at length.

In various embodiments, system 200 performs the following method for predicting geometric shape accuracy of 3D printed products 300. In various instances, the method may include determining an input representation of an object in response to a first input data (block 302). The method may further include generating an electronic model of the object in response to the input representation, the model comprising a combination of primitive shapes (block 304). The method may include predicting a shape deviation of the electronic model relative to the input representation of the object (block 306). The method may include determining layer functions $f(x)$ of the electronic model of the object (block 308). The method may include calculating a transfer function that when convolved with the at least one layer function generates the at least one shape deviation of the electronic model (block 310). This transfer function corresponding to a model incorporates a data-analytical description of an effect of interlayer interactions among the plurality of the layers and error accumulations. Further discussions of FIG. 3B and FIG. 3C will elaborate on additional aspects of block 310. Finally, the method may include generating machine control instructions for an additive manufacturing machine corresponding to the first input data, offset according to the transfer function to cancel the at least one shape deviation from the electronic model (block 312). Many aspects of block 310 are detailed extensively herein, and particularly with reference to the steps performed by transfer function 210 engine of FIG. 2.

Figure 2:
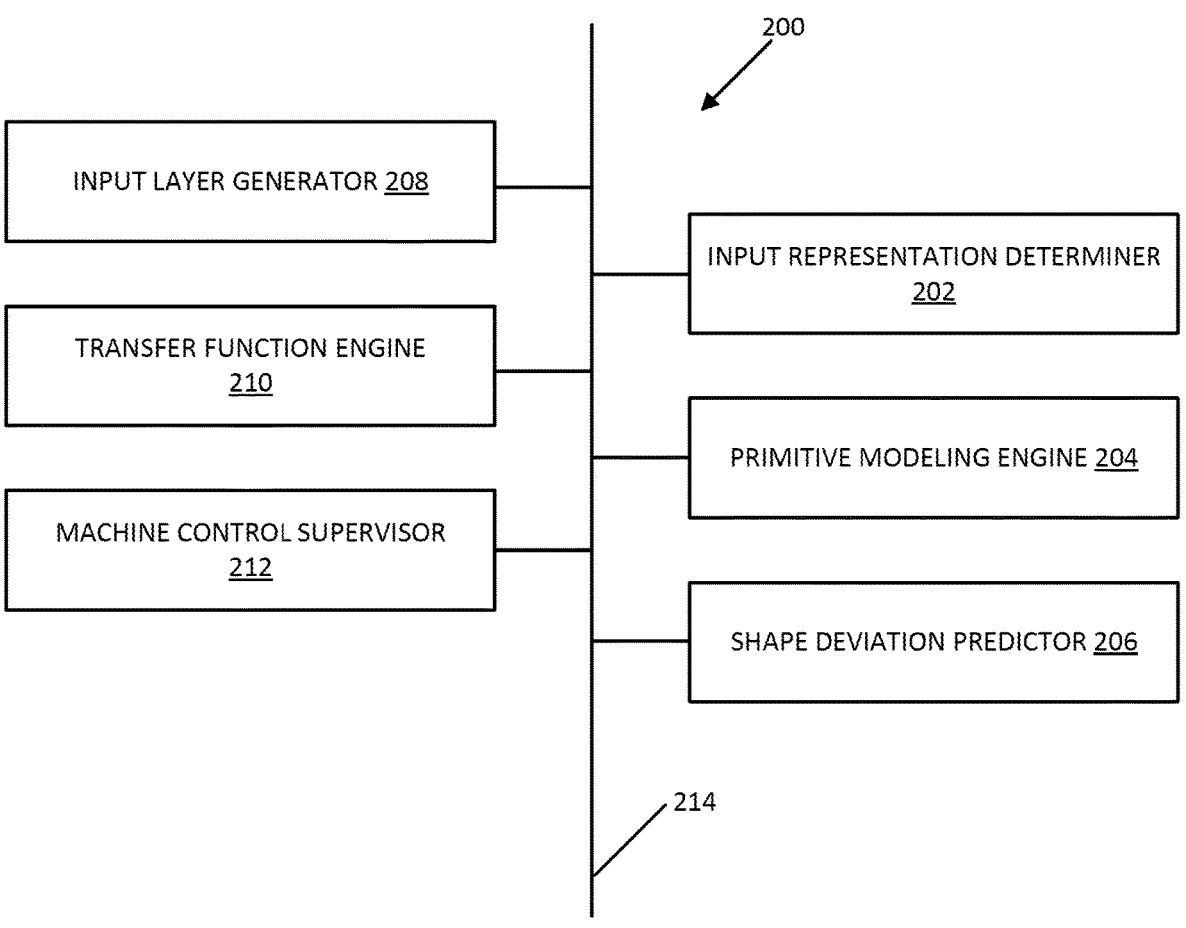
FIG. 2 illustrates an example system for predicting geometric shape accuracy of 3D printed products, in accordance with various embodiments.

Now, returning focus to system 200 and FIG. 2, the system 200 is depicted with a bus 214. The bus 214 represents electronic communication among the logical boxes. The bus 214 may be a physical electronic data bus, or may be a logical bus, or may be a combination thereof. The bus 214 provides a mechanism for information to be exchanged among the logical modules, such as during execution of one or more method discussed herein.

The system 200 may include an input representation determiner 202. An input representation determiner 202 may comprise a logical aspect of a processor and/or memory configured to determine an input representation of an object in response to a first input data. In various instances, the first input data comprises machine control instructions for instructing an additive manufacturing machine to generate an object. For instance, and with parallel reference to FIG. 1, a shape of a 3D object can be highly complex and arbitrary; however, a complex object can be represented by a combination of simpler objects, Stated differently, a manufacturable object 2 may be represented by a combination of primitive shapes, such as layers 4, 6, and 8 having a trapezoidal cross-section. For instance, a dome could be represented as a set of stacked circles of decreasing radius. Thus, an input representation of an object 2 may comprise a set of primitive shapes (layers 4, 6, 8). An input representation determiner 202 may determine an appropriate input representation by direct user input, or machine learning, or implementation of a matching algorithm to analyze a data set of potential input representations and associated objects.

The system 200 may also include a primitive modeling engine 204. A primitive modeling engine may comprise a logical aspect of a processor and/or memory configured to generate an electronic model of the object comprising a combination of the primitive shapes. For instance, a complex and continuous dome structure may have features too small for manufacturing by an additive manufacturing process. Consequently, local discontinuities may be electronically modeled to change the model to correspond to the combination of the primitive shapes with consideration for process limitations. For instance, an additive manufacturing process may construct a dome in a series of layered primitive shapes having "rough" or "stair step" or otherwise "discontinuous" edges where a continuous and uninterrupted surface may not be manufacturable.

The system 200 may also include a shape deviation predictor 206. A shape deviation predictor 206 may comprise a logical aspect of a processor and/or memory configured to predict shape deviation of the electronic model relative to the input representation of the object. For instance, a system response y(x) represents a 3D shape (boundary) deviation of an AM built object. The measurement data of a 3D object may be described in different ways, for instance, as point cloud data defined in a Cartesian Coordinate System (CCS). Depending on applications, shape representation may seek to identify effective and perceptually important shape features such as point sets, curves, surfaces, level sets or deformable templates. For accuracy control of AM built products, the contour-based feature representation may be of particular relevance.

Two types of contour shape modeling may be provided. For instance, continuous approaches may be provided and/or discrete approaches may be provided. A feature vector derived from an integral boundary, e.g., Fourier descriptors may be applied among continuous approaches. Discrete approaches tend to break the shape boundary into segments for approximation.

Representing a shape as diffeomorphism of the unit circle to itself through conformal mapping provides a mechanism for shape classification. In various instances, classification of a shape facilitates more rapid determination of a transfer function by resolving focus on the shape features, AM processes for such shapes, and associated potential defects associated with these processes. Moreover, such representations are invariant to translation and scaling, so that this approach allows one to move back and forth computationally between shapes and their diffeomorphisms.

Further representations of shapes may be contemplated, such as medial and skeletal representation, deformable templates, and geometric descriptors.

In connection with providing shape representations in a manner that facilitates generic models for quality prediction of arbitrary shapes and for determining the shape deviation y(x) (e.g., the system response), one consideration includes decoupling a geometric shape complexity from modeling of y(x). As such, in various embodiments, 2D shape deviations under a cartesian coordinate system (CCS) are transformed into deviation profiles in a polar coordinate system (PCS), and 3D shape deviations under a CCS are converted into a spherical coordinate system (SCS). In this manner, a system and method may describe shape deviations, rather than shapes themselves.

For instance, with respect to 2D shape deviations, a system response y(x) may be defined as:

$$y(x) = r(\theta) - r_0(\theta) \qquad \text{Eq. (4)}$$

Figure 4A:
FIG. 4A illustrates shape deviations for additively-manufactured circles of different sizes, in accordance with various embodiments.
Figure 4B:
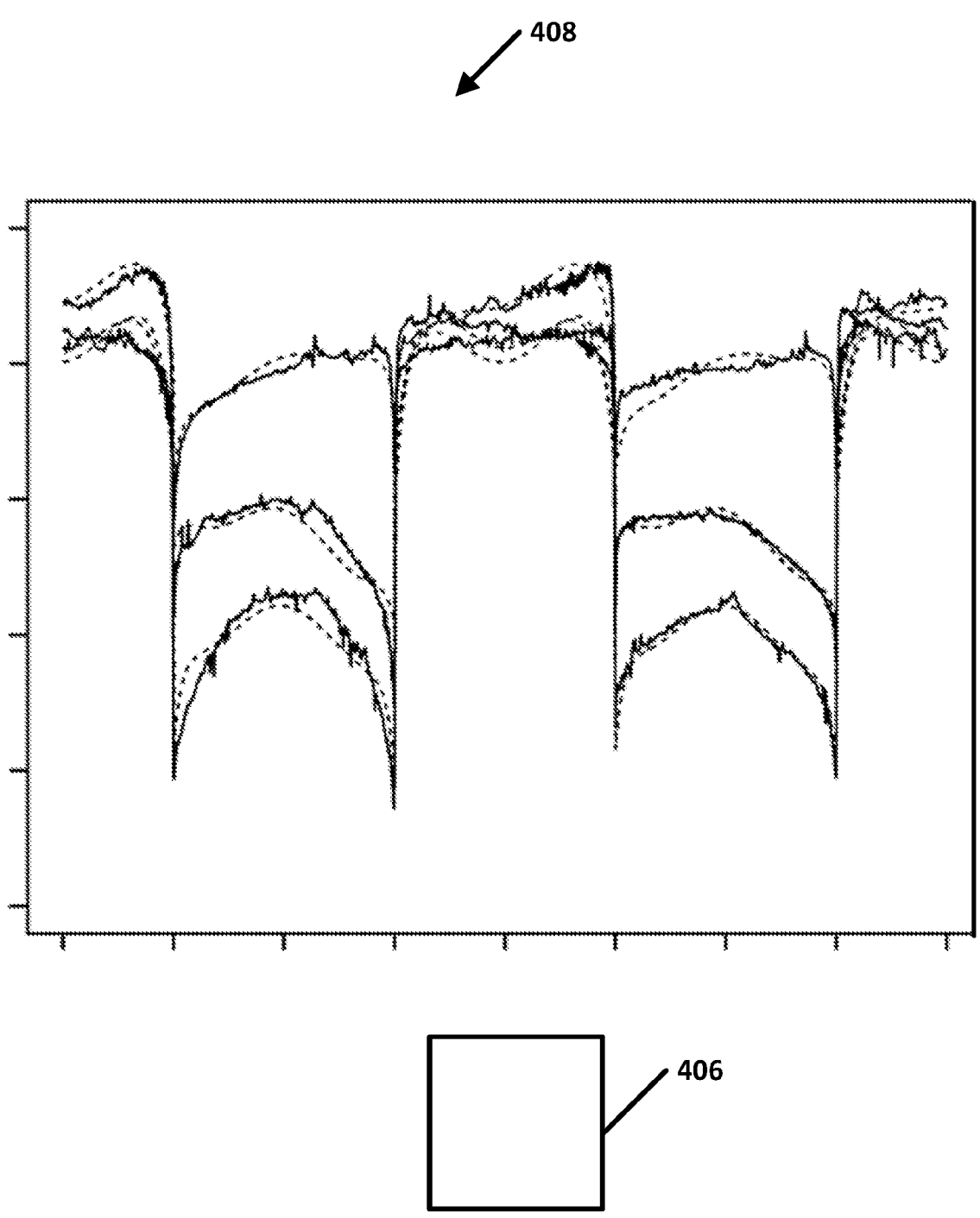
FIG. 4B illustrates shape deviations for additively-manufactured squares of different sizes, in accordance with various embodiments.
Figure 4C:
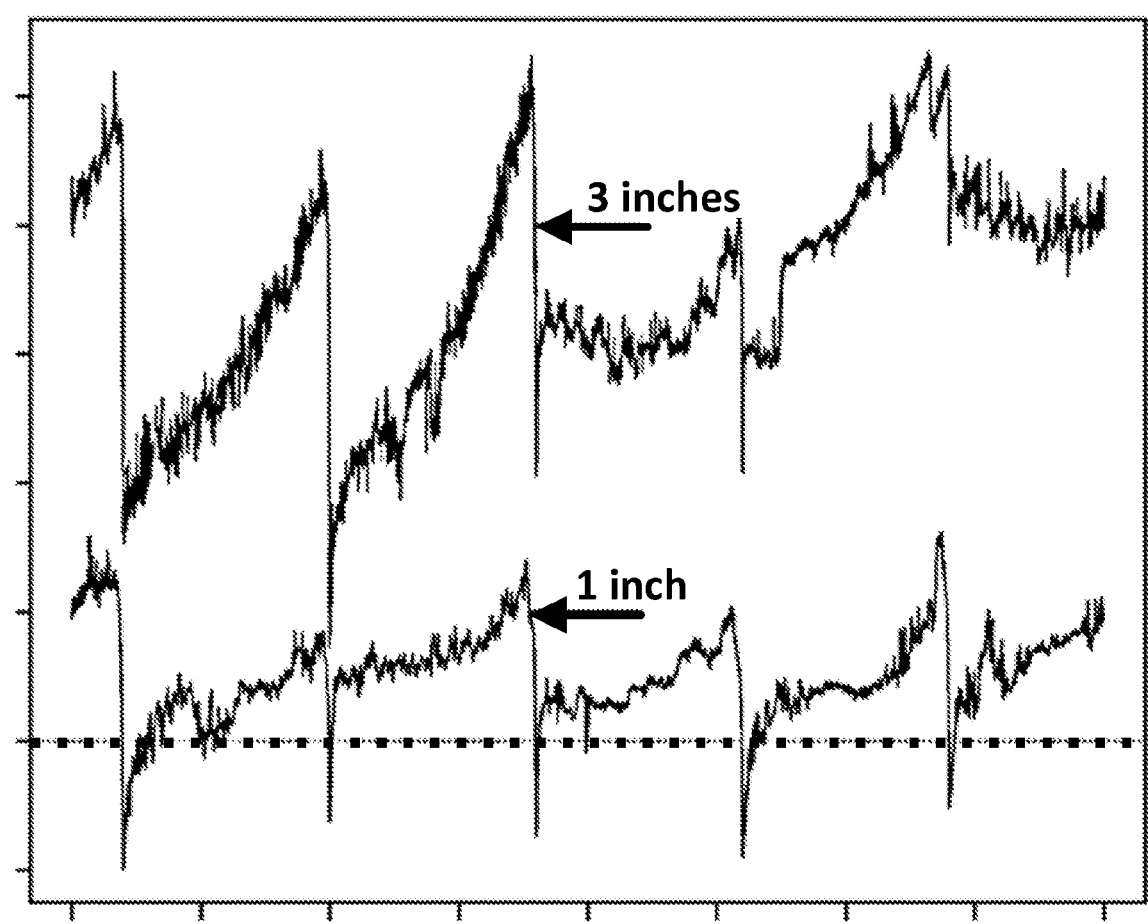
FIG. 4C illustrates shape deviations for additively-manufactured pentagons of different sizes, in accordance with various embodiments.
Figure 4C:
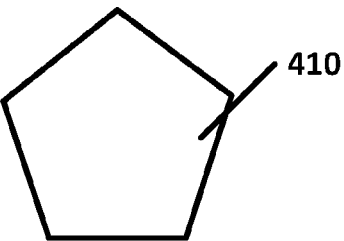

$r(\theta)$ is a measured shape as actually manufactured and $r_0(\theta)$ is a design of the shape as represented in a polar coordinate system. Here, then, $x = (r_0(\theta), \theta)$ for an example system response for 2D shape deviations. FIGS. 4A-C depict various 2D shapes and associated shape deviations. For example, FIG. 4A depicts a circle 402 having deviations according to circle deviation chart 404. Circle deviation chart 404 has multiple lines illustrating shape deviations for circles of differing sizes. As depicted in circle deviation chart 404, the shape deviation is different for circles 402 of differing sizes. FIG. 4B depicts a square 406 having deviations according to square deviation chart 408. Square deviation chart 408 has multiple lines illustrating shape deviations for squares of differing sizes. As depicted in square deviation chart 408, the shape deviation is different for squares 408 of differing sizes. FIG. 4C depicts a pentagon 410 having deviations according to pentagon deviation chart 410. Pentagon deviation chart 410 has multiple lines illustrating shape deviations for pentagons of differing sizes. As depicted in pentagon deviation chart 410, the shape deviation is different for pentagons 410 of differing sizes.

In further instances, 3D shape deviations may be determined. For example, point cloud data under a CCS could be transformed into observed radial distances $r(\theta, \varphi)$ for a point with polar angle $\theta$ and azimuth angle $\varphi$. A system response, y, may be defined as a difference as follows:

$$y(x) = r(\theta, \varphi) - r_0(\theta, \varphi) \qquad \text{Eq. (5)}$$

$r(\theta, \varphi)$ is a measured shape as actually manufactured and $r(\theta, \varphi)$ is a design of the shape as represented in a spherical coordinate system.

Figure 5A:
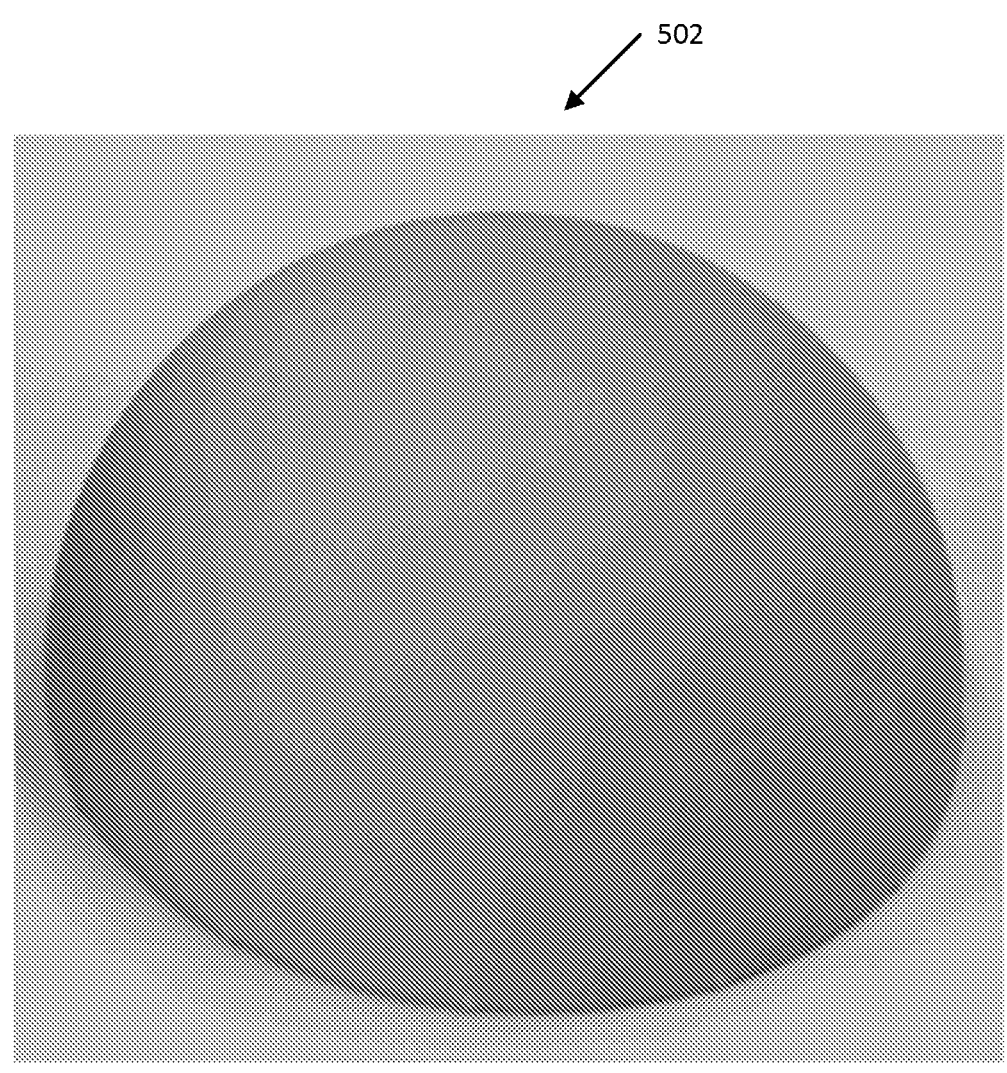
FIG. 5A depicts a dome manufactured by additive manufacturing, in accordance with various embodiments.
Figure 5B:
FIG. 5B illustrates a point cloud representation of the dome of FIG. 5A, in accordance with various embodiments.
Figure 5B:
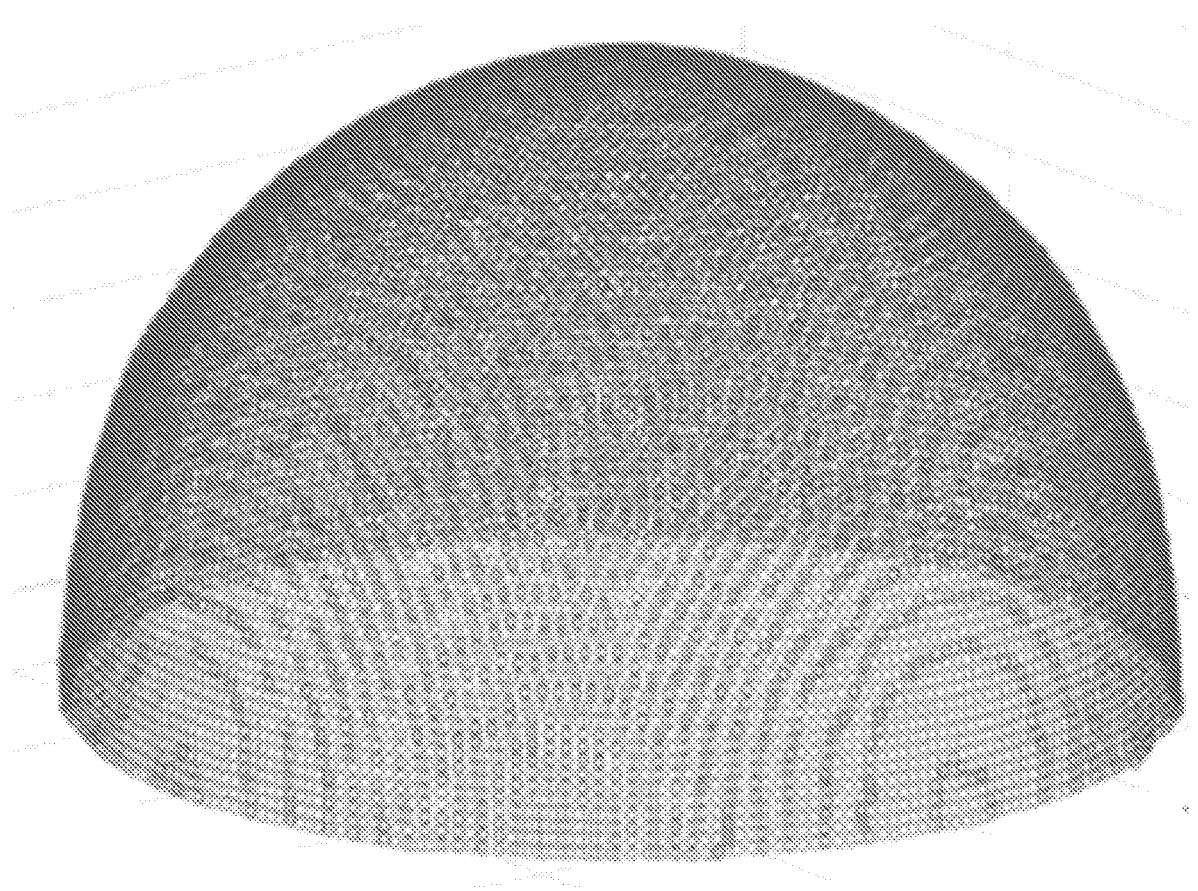
Figure 5C:
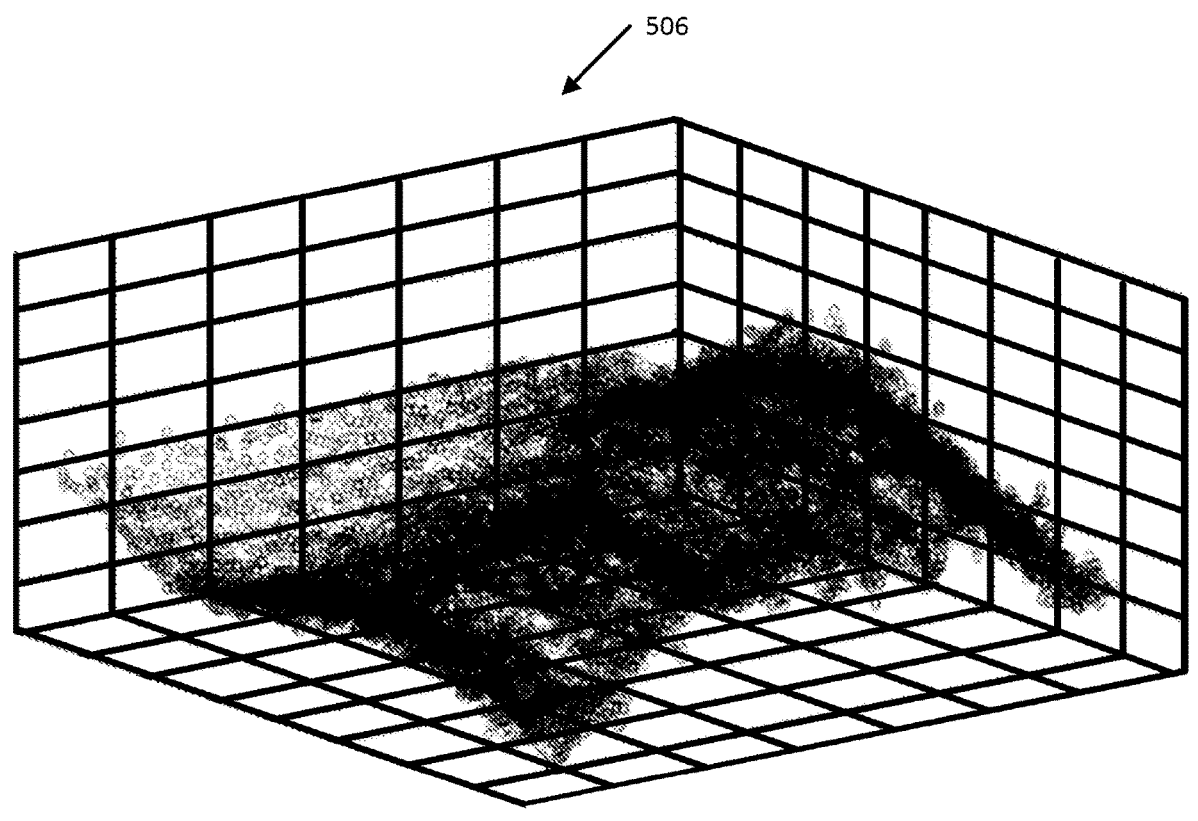
FIG. 5C depicts a shape deviation of the dome of FIG. 5A and FIG. 5B under a spherical coordinate system, in accordance with various embodiments.

Here, then, $x = (r_0(\theta, \varphi), \theta, \varphi)$ for an example system response for 3D shape deviations. FIGS. 5A-C depict an example 3D shape deviation for an example dome shape manufactured by a stereolithography additive manufacturing process. For instance, FIG. 5A depicts a dome 502 manufactured by the stereolithographic additive manufacturing process. FIG. 5B depicts a point cloud representation 504 of the dome shape of FIG. 5A, and FIG. 5C depicts a shape deviation y(x) of the dome of FIGS. 5A and 5B under a spherical coordinate system.

With renewed reference to FIG. 2, the system 200 may include an input layer generator 208. An input layer generator 208 may comprise a logical aspect of a processor and/or memory configured to determine layer functions $f(x)$ to provide to an additive manufacturing machine to manufacture a plurality of layers corresponding to the object according to the electronic model and having the having the predicted shape deviation. The input layer generator may create commands to a machine to emplace additive manufacturing material in a desired location to build the object associated with the input representation of the object. However, the object will have differences corresponding to the shape deviation associated with the electronic model. As such, the derived layer functions will generate an object with physical differences.

In various instances, one can consider, as an example case, a proper form of individual layer inputs $f(x)$, such as for a single-layer horizontal disk. One could also imagine many other different and more complex shape configurations for which an input is determinable.

In the example scenario of a single-layer horizontal disk, one may assume that—for ease of discussion—a corresponding transfer function of an AM process, g(x) varies only varies along the direction normal to the build plate (e.g., along the accumulating thickness of the layer, or the z direction), i.e., $g(x)=g(z)$ or $g(\varphi)$. Then, $g(\varphi)$ only has definition at $\varphi \approx 0$ because of the layer thickness along the z direction. One general form of this type of function is Dirac's delta function, or $\delta(x)$. Thus, under the framework presented in Eq. (1) and upon convolving with a delta function as the transfer function, $f(x)$ is determined to be:

$$f(x)=(f*\delta)(x) \qquad \text{Eq. (6)}$$

As such, one may appreciate that the individual layer input $f(x)$ may represent a deviation of the 2D horizontal disk in an x-y plane with a shape defined by a design. In this instance, having a transfer function defined as a Dirac impulse, one appreciates that interlayer interactions are null.

Figure 3B:
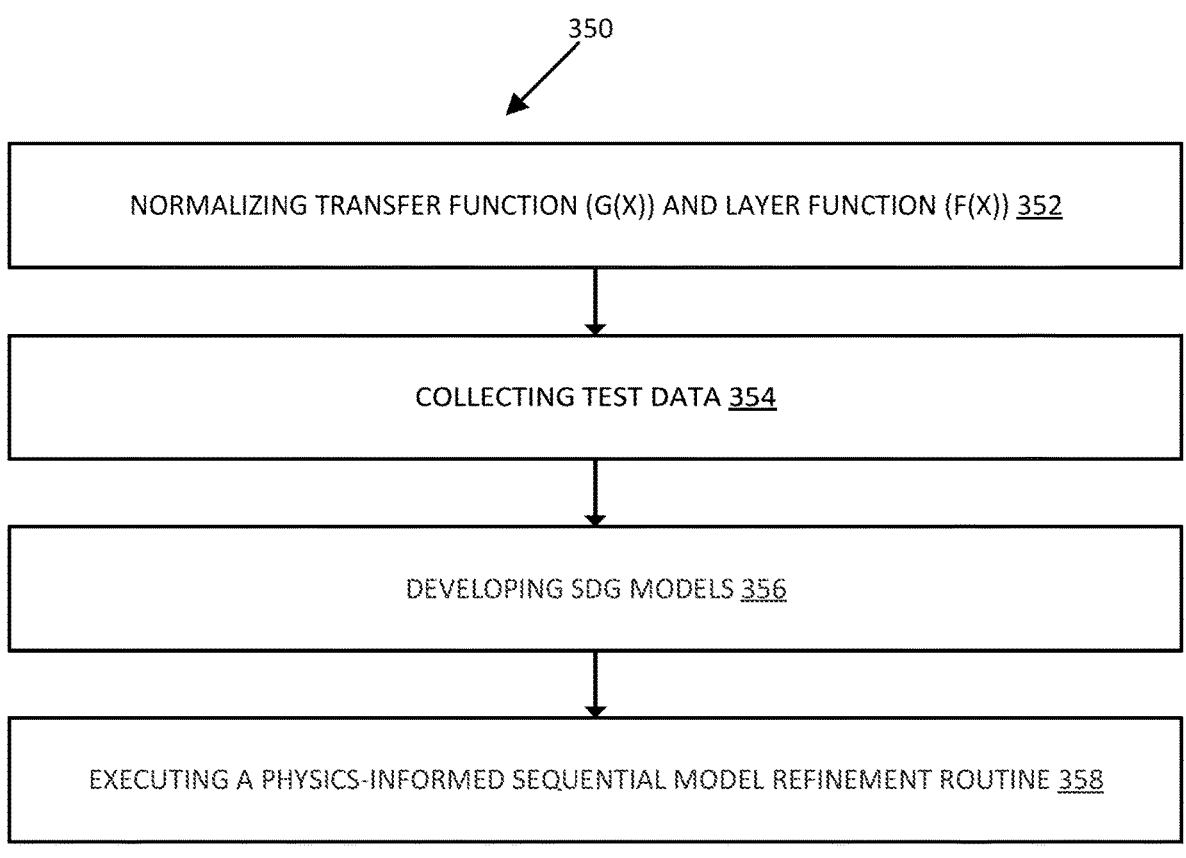
FIG. 3B illustrates an example method of model-informed estimation which may be performed as an aspect of predicting geometric shape accuracy of 3D printed products consistent with FIG. 3A, in accordance with various embodiments.

In further example, for cylindrical disks manufactured by an AM process, such as stereolithography, an input layer $f$ may be provided as:

$$f(r_0(\theta),\theta)=c_1(r_0)+c_2(r_0)\cos(2\theta) \qquad \text{Eq. (7)}$$

where coefficients can be obtained through estimation based on FIGS. 3A-C. Moreover, in various instances, statistical methods and machine learning methods are implemented to determine the individual, layer input $f$.

The system 200 may include a transfer function engine 210. An transfer function engine 210 may comprise a logical aspect of a processor and/or memory configured to determine a transfer function of the additive manufacturing system corresponding to a model incorporating a data-analytical description of an effect of interlayer interactions among the plurality of the layers and error accumulations. Consequently, the transfer function reflects both path and process dependent errors. The transfer function engine 210 may calculate a transfer function that when convolved with the layer function(s) generates the shape deviation(s) of the electronic model.

The following discussion will elaborate in detail methods executed by the transfer function engine 210 for 2D shapes and for 3D shapes. This elaboration will include reference to FIGS. 3A, 3B, and 3C, which depict aspects of methods executed by the transfer function engine 210. Moreover, one may appreciate that while method blocks are shown as separate, these aspects may be conducted together, in multi-threading, or in differing sequences as appropriate. Furthermore, while the discussion of transfer function engine 210 provides a convenient structure for discussion of the method blocks, these blocks may be executed by other aspects of system 200, or by combinations of aspects of system 200.

As mentioned, layer buildup along the z direction incurs the inter-layer interaction problem in AM. Complete inter-layer bonding implies full density and continuous interface between successively fabricated layers, while poor bonding may cause delamination and defects like balling or beading across a layer.

The transfer function g(x) in the convolution formulation provides an analytical description of the effect of inter-layer interactions on build accuracy. One may consider a simple case of building half cylindrical disks along the z direction, where the g(x) is a univariate function assigning weights for individual layer inputs. One may also consider a 3D case of building domes with various sizes. The system described herein includes a Shape Deviation Generator (SDG) that provides a data-analytical framework to learn geometric measurement data of AM built products. Under a convolution framework, SDG enables a consistent description of 3D shape formation in layer-by-layer fabrication processes.

For one example case to demonstrate development of a transfer function, one may consider vertically-printed half disks. Since such disks may be approximated as a 2D shape, the convolution framework may be provided as follows:

$$y(\varphi)=(f*g)(\varphi)+E \qquad \text{Eq. (8)}$$

Size of the disk, specifically, nominal radius $r_0$ is an additional covariate, as size may be directly proportional to number of layers. Consequently, the convolution framework (SGD model) maybe rewritten as follows:

$$y(r_0,\varphi)=\alpha(r_0)(f*g)(r_0,\varphi)+(r_0)+E \qquad \text{Eq. (9)}$$

$$y(r_0,\varphi)=\int_0^\varphi f(r_0,\tau)g(r_0,\varphi-\tau)d\tau+\beta(r_0)+E \qquad \text{Eq. (10)}$$

In this configuration, $\alpha(r_0)$ and $\beta(r_0)$ are scaling and location parameters depending on $r_0$.

$f(r_0,\varphi)$ is a deviation function of a same shape built horizontally. Returning to the equations immediately above, in various embodiments, identifying g(x) which is a transfer function of the AM system, comprises a deconvolution calculation. In various instances, signal processing, statistical model determination, and machine learning (including neural networks) are applicable to perform a deconvolution.

In one example deconvolution, a model-informed estimation approach may be applied in an aspect of calculating a transfer function that when convolved with the at least one layer function generates the at least one shape deviation of the electronic model. Specifically, when calculating the transfer function and directing attention to FIG. 3B, a model-informed estimation approach 350 may include normalizing transfer function (g(x)) and layer function (f(x)) (block 352), collection of test data (block 354), developing SDG models (block 356), and executing a physics-informed sequential model refinement (block 358). One may further appreciate that the approach 350 further corresponds to an element of block 310 of FIG. 3A, which may be executed by the transfer function engine 210 of FIG. 2. Attention is also directed to FIGS. 2, 3A, 3B, and 3C for a more detailed discussion of various processes executed by the transfer function engine 210 in connection with a model-informed estimation approach 350 to determining a transfer function for block 310.

A transfer function g(x) and layer function $f(x)$ may be normalized (block 352) for a convolution integral (block 352) as follows. To normalize $f(x)$, it may proceed that by following the results in the discussion of Eq. 6 above $(y(x)=r(\theta)-r_0(\theta))$ for stereolithography processes, it may be determined that $f(r_0(\theta,\varphi)=c_1(r_0)+c_2(r_0)\cos(2\varphi)$. In various embodiments, coefficients $c_1(r_0)$ and $c_2(r_0)$ relating to size $r_0$ may be absorbed by $\alpha(r_0,\varphi)$ and $\beta(r_0)$ mentioned in Eq. 9 and Eq. 10. Consequently, it may be equivalent to take $f(r_0,\varphi)=\cos(2\varphi)$, which may be termed the "normalized" functional basis.

To normalize $g(x)$, in example embodiments, a basis function is selected that is a Fourier base. For example, given $f(r_0,\varphi)=\cos(2\varphi)$ then:

$$g(r_0,\varphi)=\sin\;[(n(r_0)\varphi+\psi(r_0)] \qquad \text{Eq. (11)}$$

$\psi(r_0)$ is a phase variable and $n(r_0)$ is a real number. Note that both $\psi$ and $n$ are potentially related to a size covariate $r_0$.

In connection with the normalization of $f(x)$ and $g(x)$, the convolution framework (SGD model) maybe rewritten as follows:

$$y(r_0,\varphi)=\alpha(r_0)\textstyle\int_0^\varphi \cos(2r)\sin[(n(r_0)(\varphi-\tau)+\psi(r_0)]d\tau+\beta \\ (r_0)+E \qquad \text{Eq. (12)}$$

One may further appreciate that one may define $h(r_0,\varphi)=\int_0^\varphi \cos(2\tau)\sin[(n(r_0)(\varphi-\tau)+\psi(r_0)]d\tau$ so that a convenient expression of the convolution framework (SGD model) is:

$$y(r_0,\varphi)=\alpha(r_0)h(r_0,\varphi)+\beta(r_0)+E \qquad \text{Eq. (13)}$$

Insights are obtainable from a comparison of this SDG model for disks built vertically with the SDG model for horizontal disks discussed in Eq. (7) and reproduced here: $f(r_0(\theta),\theta)=c_1(r_0)+c_2(r_0)\cos(2\theta)$. By $f(x)=(f*\delta)(x)$ the model for the horizontal disk is a special case of the model of Eq. (13), specifically, a special case of the model $y(r_0,\varphi)=\alpha(r_0)h(r_0,\varphi)+\beta(r_0)+E$ with $g(x)=\delta(x)$ in the convolution integral of $h(r_0,\varphi)$.

Upon integration, $h(r_0,\varphi)$ becomes:

$$h(r_0,\varphi)=\int_0^\varphi \cos(2\tau)\sin[(n(r_0)(\varphi-\tau)+\psi(r_0)]d\tau = \\[6pt] \frac{-n(r_0)}{n(r_0)^2-4}\cos[n(r_0)\varphi+\psi(r_0)]+ \\[6pt] \frac{1}{2n(r_0)+4}\cos[2\varphi-\psi(r_0)+\frac{1}{2n(r_0)-4}\cos[2\varphi+\psi(r_0) \qquad \text{Eq. (14)}$$

Thus, in various embodiments, $f(x)$ and $g(x)$ are normalized (block 352). A basis function selected for the normalization may comprise one or more Fourier base.

A collection of test data (block 354) may proceed as follows. A commercial mask-image-projection-based stereolithography apparatus may be used, in one example, to build four half-cylindrical disks vertically. This SLA process uses a digital micromirror device to project a set of mask images onto the resin surface to cure layers. After solidification of each layer, the building platform moves down at a predefined amount for the next layer. Process parameters and the design of four parts are shown in Table I.

TABLE I

Specifications of SLA Process and Design Parameters

| | |
|---|---|
| Resolution of the mask | 1920 × 1200 |
| Dimension of each pixel | 0.005" |
| Thickness of each layer | 0.00197" |
| Illuminating time of each layer | 10-15 s |
| Type of the resin | Perfactory SI 500 |
| Radii of half cylinders | 0.5", 0.8", 1.5", 2.0" |

Figure 6:
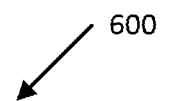
FIG. 6 depicts a shape deviation of four different half-cylindrical discs built vertically; in accordance with various embodiments.
Figure 6:
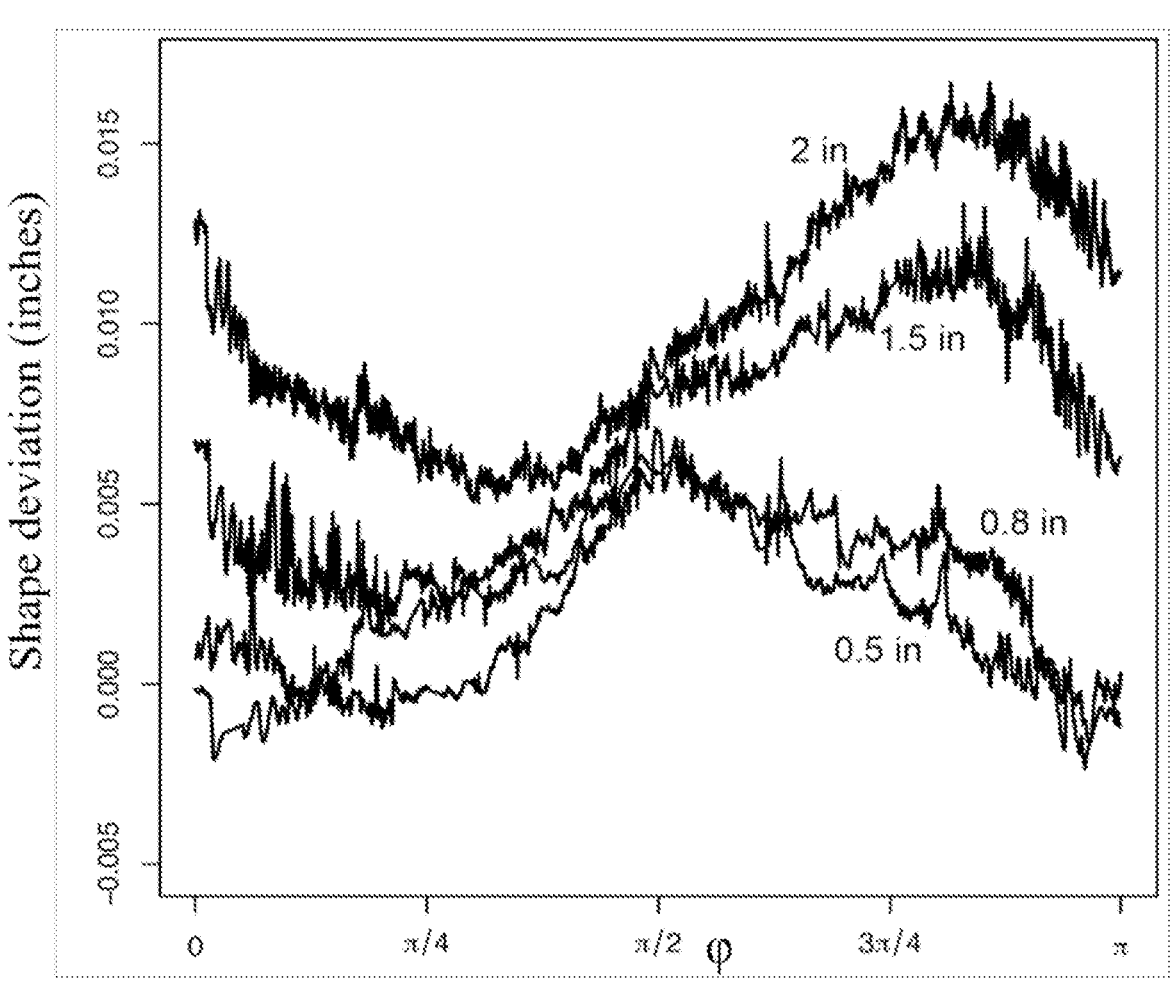

Maintaining reference to FIG. 3B but also with reference to FIG. 6, under a polar coordinate system, FIG. 6 illustrates a graph 600 of shape deviations for each of the four half-cylindrical disks built vertically. Notably, and as discussed elsewhere herein, the effects of error accumulation and interlayer interactions along the z-axis are demonstrated by the different shape deviation patterns exhibited by the differently sized half-cylindrical disks. Elaborating further, SDG model determination (block 356) may proceed as follows. In various instances, such estimation is for 2D models, though in further instances, 3D models may be estimated. Initial SDG model determination may be accomplished through a maximum likelihood estimation (MLE). The maximum likelihood estimation may be performed in connection with Eq. 12. For instance, multiple separate models of Eq. 12 are obtained from multiple shapes built vertically. In various embodiments, four separate models are obtained. The shapes may be half-disks built vertically. In various embodiments $r_0=0.5$", 0.8", 1.5", and 2.0" for the four half-disks. The results of estimated parameters are presented in Table II and the predicted shape deviations may be developed by model fitting curves to the graph 600 of FIG. 6.

TABLE II

Initial Model Estimation Through MLE

| $r_0$ | $\alpha(r_0)$ | $n(r_0)$ | $\psi(r_0)$ | $\beta(r_0)$ | $\sigma$ |
|---|---|---|---|---|---|
| 0.5" | 0.0220 | 0.4493 | −0.0928 | 0.0002 | 0.0007 |
| 0.8" | 0.0069 | 0.9158 | −0.7619 | 0.0013 | 0.0008 |
| 1.5" | 0.0056 | 1.1916 | −2.0898 | 0.0054 | 0.0008 |
| 2.0" | 0.0055 | 1.9238 | −3.2883 | 0.0087 | 0.0008 |

Physics-informed sequential model refinement (block 358) may proceed as follows. Attention is additionally directed to FIG. 3C, for a discussion in greater detail of aspects of the physics-informed sequential model refinement represented in block 358 of FIG. 3B. The initial model determination indicates that $\alpha(r_0)$, $\beta(r_0)$, $n(r_0)$, and $\psi(r_0)$ may, in various embodiments, vary with covariate r0. Consequently, in various embodiments, SDG model determination and physics-informed sequential model refinement may comprise a first sequential model refinement. The first sequential model refinement may be implemented, particularly, with respect to $n(r_0)$. A second sequential model refinement may be implemented, particularly, with respect to $\psi(r_0)$. Notably, both are inside convolution integral $h(r_0,\varphi)$.

More specifically, a first sequential model refinement (of $n(r_0)$) may comprise a transfer function refinement corresponding to a length of interaction window (block 3582). For instance, layers may interact, and interlayer interactions contribute to the shape deviations. A duration of interaction among layers that causes a layer to change maybe termed an interaction window. In various instances, a length of an interaction window is associated with a periodicity of the transfer function $g(x)$. In various embodiments, $n(r_0)$ corresponds to a period of transfer function, $g(x)$, such as provided in Eq. (11) which recites: $g(r_0,\varphi)=\sin[(n(r_0)\varphi+\psi(r_0)]$.

As a number of layers increases, an interaction of adjacent layers will be of increasing complexity. For instance, energy penetration and remelting may occur with greater complexity in objects having greater numbers of layers. Accordingly, $n(r_0)$ may increase with the number of layers or $r_0$. A long period or small $n(r_0)$ will, in various instances, assign similar weights to adjacent layers. However, interlayer interactions operate within a window with a certain length defined by a certain number of consecutive layers. For instance, a depth of energy penetration or remelting is limited by thermal properties of materials and energy input to the AM process. Thus, in various instances, $n(r_0)$ may be:

$$n(r_0) = \frac{r_0}{r^*} \qquad \text{Eq. (15)}$$

As such, $r_0$ may be a nominal radius of the disk and $r^*$ may be a theoretical length of the interaction window.

Figure 7:
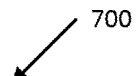
FIG. 7 depicts to a ratio of an area of a half-disk to an area of a theoretical window for one aspect of refining a model, in accordance with various embodiments.
Figure 7:
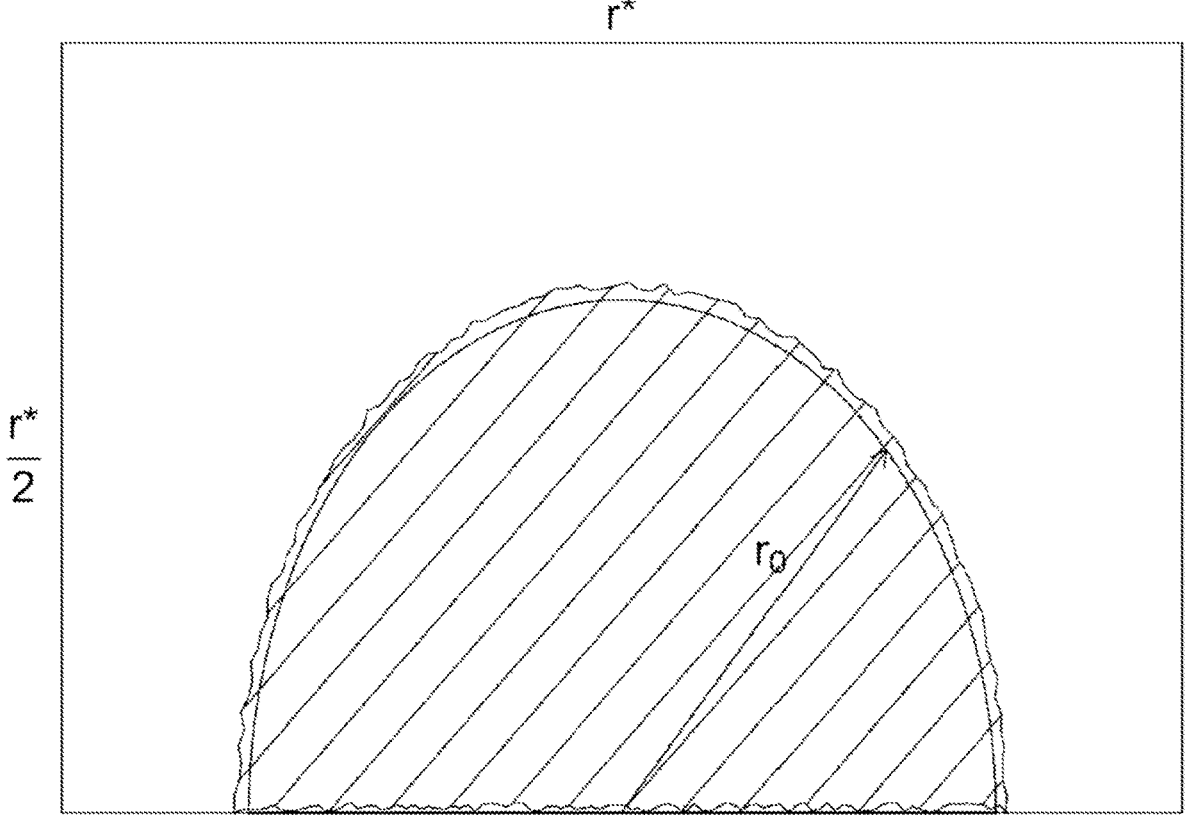

A second sequential model refinement may be implemented (block 3584). A second sequential model refinement (of $\psi(r_0)$) may be comprise a transfer function refinement corresponding to a phase shift. A change of layer area between the adjacent layers will also affect transfer function $g(x)$. If all adjacent layers within an interaction window are identical, $g(x)$ defined in previously is expected to have $\psi(r0)=0$ because only the number of layers varies. As such, $v(r0)$ is, in various embodiments, related to a ratio of the area of the half-disk to the area of a theoretical window shown in graph 700 of FIG. 7. Moreover, the estimated values of $\psi(r0)$ may be all negative, and as such, in various instances, the second sequential model refinement corresponding to a phase shift may be:

$$\psi(r_0) = \frac{r_0^2}{r^{*2}} \qquad \text{Eq. (16)}$$

Having developed a first and a second sequential model refinement, the initial SGD model determination may be updated to be a first updated SGD model determination consistent with the first and second sequential model refinement. In various instances, a first updated SGD model determination comprises:

$$h(r_0, \varphi) =$$

$$\int_0^\varphi \cos(2\tau)\sin\left[\frac{r_0}{r^*}(\varphi - \tau) - \frac{r_0^2}{r^{*2}}\right]d\tau = \frac{r_0 r^*}{r_0^2 - 4r^{*2}}\cos\left[\frac{r_0}{r^*}\varphi - \frac{r_0^2}{r^{*2}}\right] + \qquad \text{Eq. (17)}$$

$$\frac{r^*}{2r_0 + 4r^*}\cos\left[2\varphi + \frac{r_0^2}{r^{*2}}\right] + \frac{r^*}{2r_0 - r^*}\cos\left[2\varphi - \frac{r_0^2}{r^{*2}}\right]$$

Implementing Eq. (17), and the associated first and second refinement, a first updated SGD model determination may be generated by performing a curve fitting operation (block 3586). More specifically, a NILE curve fitting estimation may be conducted on the first updated SGD model determination having the updated length of interaction window and updated phase shift term.

The MLE curve fitting estimation is reflected in Table III below. This improved model comprises the first updated SGD model determination.

TABLE III

Sequential Model Refinement with first and second refinements on $n(r_0)$ and $\psi(r_0)$

| Parameters | Estimate | Standard Error |
|---|---|---|
| $r^*$ | 1.11589962 | 0.00401990 |
| $\alpha_{0.5"}$ | 0.01771531 | 0.00055778 |
| $\alpha_{0.8"}$ | 0.00957536 | 0.00027614 |

TABLE III-continued

Sequential Model Refinement with first and second refinements on $n(r_0)$ and $\psi(r_0)$

| Parameters | Estimate | Standard Error |
|---|---|---|
| $\alpha_{1.5"}$ | 0.00534351 | 0.00010980 |
| $\alpha_{2.0"}$ | 0.00555896 | 0.00010031 |
| $\beta_{0.5"}$ | 0.00050797 | 0.00007831 |
| $\beta_{0.8"}$ | 0.00103725 | 0.00006886 |
| $\beta_{1.5"}$ | 0.00551954 | 0.00006387 |
| $\beta_{2.0"}$ | 0.00883869 | 0.00006383 |
| $\sigma_E$ | 0.00103552 | 0.00002059 |

In various instances, the first updated SGD model determination may be further enhanced. For instance, a third sequential model refinement of a transfer function term corresponding to a constraint term may be performed (block 3588). In various embodiments, the third sequential model refinement comprises determining a functional form of $\alpha(r_0)$. While the subsequent operations will be enumerated in greater detail in the following paragraphs, the role of the third sequential model refinement and a fourth sequential model refinement (to be discussed) is such that a brief introduction of both together is helpful. Similarly, a fourth sequential model refinement of a transfer function term corresponding to a second constraint term may be performed (block 35812). In various embodiments, the fourth sequential model refinement of the transfer function term corresponding to the second constraint term may comprise determining a functional form of $\beta(r_0)$. Correspondingly, there may be generated a third updated SGD model determination consistent with the fourth sequential model refinement by performing a curve fitting operation thereon (block 38514) following block 35812. Finally, the sequential model refinements may be followed by augmenting the third updated SGD model determination with a gaussian process regression (block 35816).

Underlying both the third and fourth sequential model refinements, is a proposition that $\alpha(r_0)$ and $\beta(r_0)$ may be determined for values corresponding to the Table III improved model and to the two boundary conditions previously mentioned, specifically: B1. If $x=r(\theta,\phi)\to 0$, $y(x)\to 0$ and B2. If $x=r(\theta,\phi)\to\infty$, $y(x)$ is bounded.

Notably, when $(r_0)\to 0$, the first term of $h(r_0,\varphi)$ tends to zero while the second and third terms cancel each other. One constraint for $\alpha(r_0)$ is that $\alpha(r_0)(r_0)\to 0$ when $(r0)\to 0$. The remaining teiiir of the expected value of $y(r_0,\varphi)$ is $\beta(r_0)$. Therefore, $\beta(r0)\to 0$ when $r_0\to 0$ because $\beta(r_0)$ determines a mean shape deviation. It must be close to 0 if a product with negligible size is built. Thus, the boundary condition B1 will be satisfied for $r_0\to 0$. When $r_0\to\infty$), the first three terms of $h(r_0,\varphi)$ all tend to 0. Moreover, $\alpha(r_0)/r\to$constant when $r_0\to\infty$. The expected value of $y(r_0,\varphi)$ will tend to $\beta(r_0)$, which has to be bounded. Thus, to summarize constraints for $\alpha(r_0)$ and $\beta(r_0)$:

$$\alpha(r_0)(r_0)\to 0, \ \beta(r_0)\to 0; \ \text{if } r_0\to 0 \ \alpha(r_0)/r_0\to\text{constant}; \beta$$
$$(r_0)\to\text{constant; if } r_0\to\infty \qquad \text{Eq. (18)}$$

To obtain a proper form of $\alpha(r_0)$ satisfying constraints listed in Eq. (18), a third sequential model refinement strategy may be implemented. As before, the third sequential model refinement strategy may be physics-informed. Specifically, $\alpha(r_0)$ is refined to reflect:

$$\alpha(r_0)=\alpha_2 r_0^{\alpha_1} \qquad \text{Eq. (19)}$$

Consequently, executing the third sequential model refinement (of $\alpha(r_0)$) of the transfer function delivers a refinement corresponding to a first restraint term (block 3588). The first restraint term may be $\alpha(r_0)$. Stated differently, the refinement corresponds to refinement of $\alpha(r_0)$ per Eq. (19) (e.g., an "alpha term refinement"). Solving in view of Eq. (19) renders a further refined model corresponding to an equation below:

$$y(r_0,\varphi)=\alpha_2 r_0{}^{\alpha_1}h(r_0,\varphi)+\beta(r_0)+\epsilon \qquad \text{Eq. (20).}$$

Subsequently, there may be generated a second updated SGD model determination consistent with the first, second, and third sequential model refinements (block 35810). This generating may be performed by executing a MLE curve fitting estimation. For instance, implementing Eq. (20) and the associated third sequential model refinement (e.g., alpha term refinement), a MLE curve fitting estimation may be conducted and is reflected in Table IV below.

TABLE IV

Sequential Model Refinement with first and second refinements on $n(r_0)$ and $\psi(r_0)$ and $\alpha(r_0)$

| Parameters | Estimate | Standard Error |
|---|---|---|
| r* | 1.11636406 | 0.00460214 |
| $\alpha_1$ | −085252348 | 0.02892385 |
| $\alpha_2$ | 0.00880909 | 0.00012932 |
| $\beta_{0.5"}$ | 0.00042821 | 0.00007754 |
| $\beta_{0.8"}$ | 0.00053241 | 0.00006941 |
| $\beta_{1.5"}$ | 0.00515338 | 0.00006512 |
| $\beta_{2.0"}$ | 0.00870620 | 0.00006698 |
| $\sigma_E$ | 0.00110081 | 0.00002262 |

Notably, each coefficient is significant at the 0.001 level. Moreover, the boundary conditions for $\alpha(r_0)$ are satisfied (for example, notice that $\alpha_1=-0.853$). Thus, the second updated SGD model determination that is consistent with the third sequential model refinement comprises a model consistent with Eq. (20): $y(r_0,\varphi)=\alpha_2 r_0{}^{\alpha_1}h(r_0,\varphi)+\beta(r_0)+E$ Eq. (20).

To obtain a proper form of $\beta(r_0)$ satisfying constraints listed in Eq. (18), a fourth sequential model refinement of a transfer function term corresponding to a second constraint term may be formed (block 35812). The fourth sequential model refinement of the transfer function term corresponding to the second constraint term may comprise determining a functional form of $\beta(r_0)$.

For instance, a sigmoid function with a logistic function base $S(x)=1/(1+e^{-x})$ is determinable. In addition, a shift, intercept, and scaling term may be introduced. For example: $b_3 S(x+b_1)+b_2$. By satisfying $\beta(0)=0$ is determinable and grouping unknown coefficients, a final form of $\beta(r_0)$ may be:

$$\beta(r_0) = \frac{c_2}{c_1 + e^{-r_0}} - \frac{c_2}{c_1 + 1} \qquad \text{Eq. (21)}$$

Substituting $\beta(r_0)$ into the associated function $y(r_0,\varphi)$ provides the fourth sequential model refinement such that the third updated SGD model determination consistent with the first, second, third, and fourth sequential model refinements (block 35814) comprises:

$$y(r_0, \varphi) = a_2 r_0{}^{a_1} h(r_0, \varphi) + \frac{c_2}{c_1 + e^{-r_0}} - \frac{c_2}{c_1 + 1} + E. \qquad \text{Eq. (22)}$$

This model is the final SDG model for half-disks built vertically. There may be generated a third updated SGD model determination consistent with the first, second, third, and fourth sequential model refinements (block 35814). This generating may be performed by executing a MLE curve fitting estimation, such as final model determination through MLE and applying this model corresponds to the values in Table V below.

TABLE V

Sequential Model Refinement with first and second refinements on $n(r_0)$ and $\psi(r_0)$ and $\alpha(r_0)$ and $\beta(r_0)$

| Parameters | Estimate | Standard Error |
|---|---|---|
| r* | 1.12310491 | 0.00528744 |
| $\alpha_1$ | −0.83753308 | 0.02648314 |
| $\alpha_2$ | 0.00852358 | 0.00012209 |
| $c_1$ | −0.01077476 | 0.00385099 |
| $c_2$ | 0.00130300 | 0.00004232 |
| $\sigma_E$ | 0.00118232 | 0.00002414 |

Having developed a model corresponding to a transfer function for half-disks built vertically, further process insights may be discussed. For instance, the convolution not only provides a framework for developing models of predicting shape deviations, but also provides process information. For instance, using the model for vertically built half-disks, as an example, the three terms in $h(r_0,\varphi)$ may be subject to further definition and analysis. For instance, Eq. (17) is reconfigurable as:

$$h_1(r_0, \varphi) = \frac{r_0 r^*}{r_0^2 - 4r^{*2}} \cos\left[\frac{r_0}{r^*}\varphi - \frac{r_0^2}{r^{*2}}\right] \qquad \text{Eq. (23)}$$

$$h_2(r_0, \varphi) = \frac{r^*}{2r_0 + 4r^*} \cos\left[2\varphi + \frac{r_0^2}{r^{*2}}\right] \qquad \text{Eq. (24)}$$

$$h_3(r_0, \varphi) = \frac{r^*}{2r_0 - r^*} \cos\left[2\varphi - \frac{r_0^2}{r^{*2}}\right] \qquad \text{Eq. (25)}$$

Figure 8:
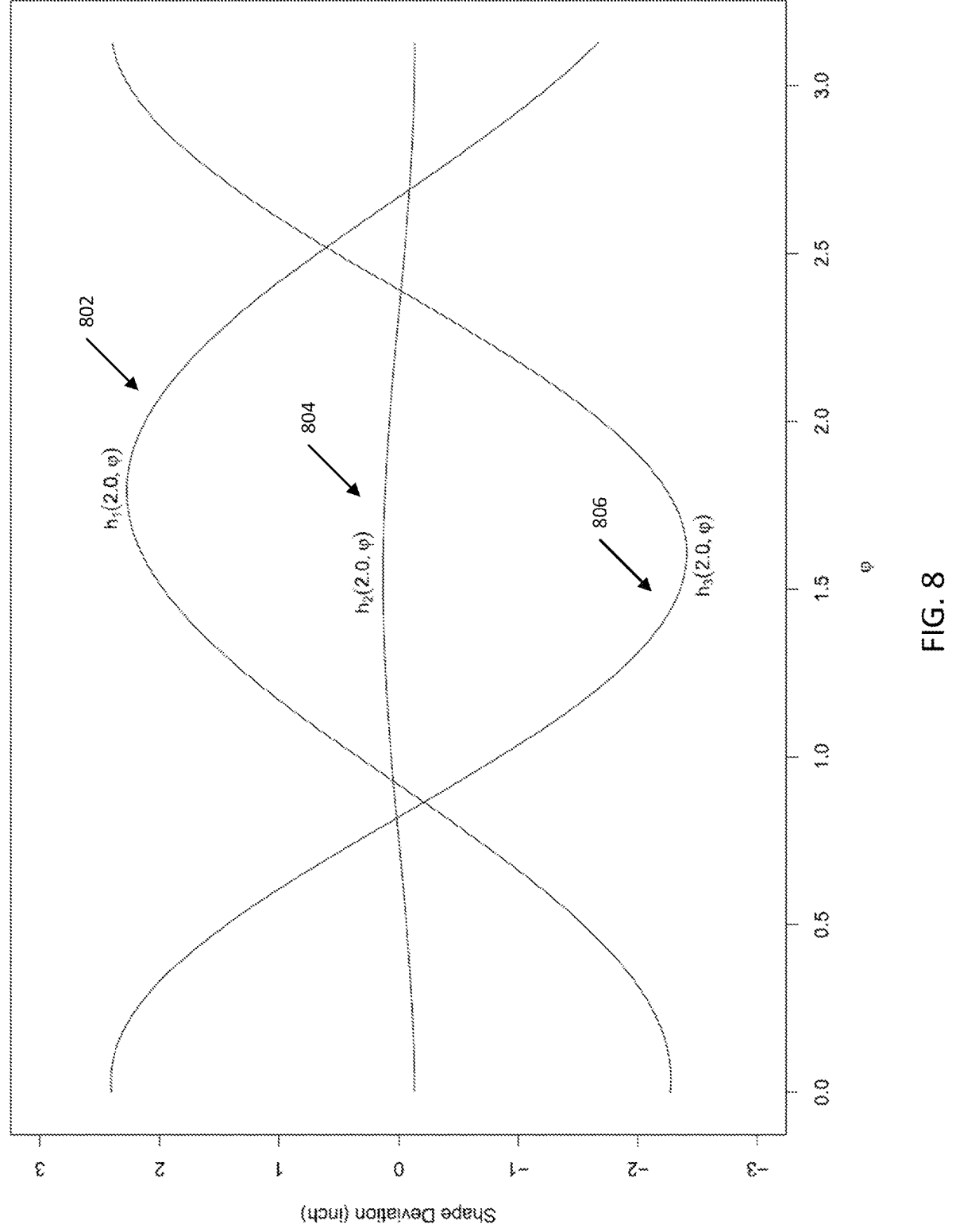
FIG. 8 illustrates a graph relating $\varphi$ with shape deviation for each of three terms of a model, in accordance with various embodiments.

Given $r_0=2.0$, the $h_2$ term has lesser influence among the three terms due to the smaller weights assigned to base function $f(r_0,\varphi)$ in the convolution. Moreover, by varying the terms and observing outcomes, a framework linking physical properties associated with manufacturing of the object to each of the three $h_{1,\ 2,\ 3}$ terms is ascertained. For example, FIG. 8 illustrates a graph relating $\varphi$ with shape deviation in inches for each of the three terms. A first line 802 depicts a relationship between $\varphi$ and shape deviation in inches for $h_1$. A second line 804 depicts a relationship between $\varphi$ and shape deviation in inches for $h_2$. A third line 806 depicts a relationship between $\varphi$ and shape deviation in inches for $h_3$.

Figure 9A:
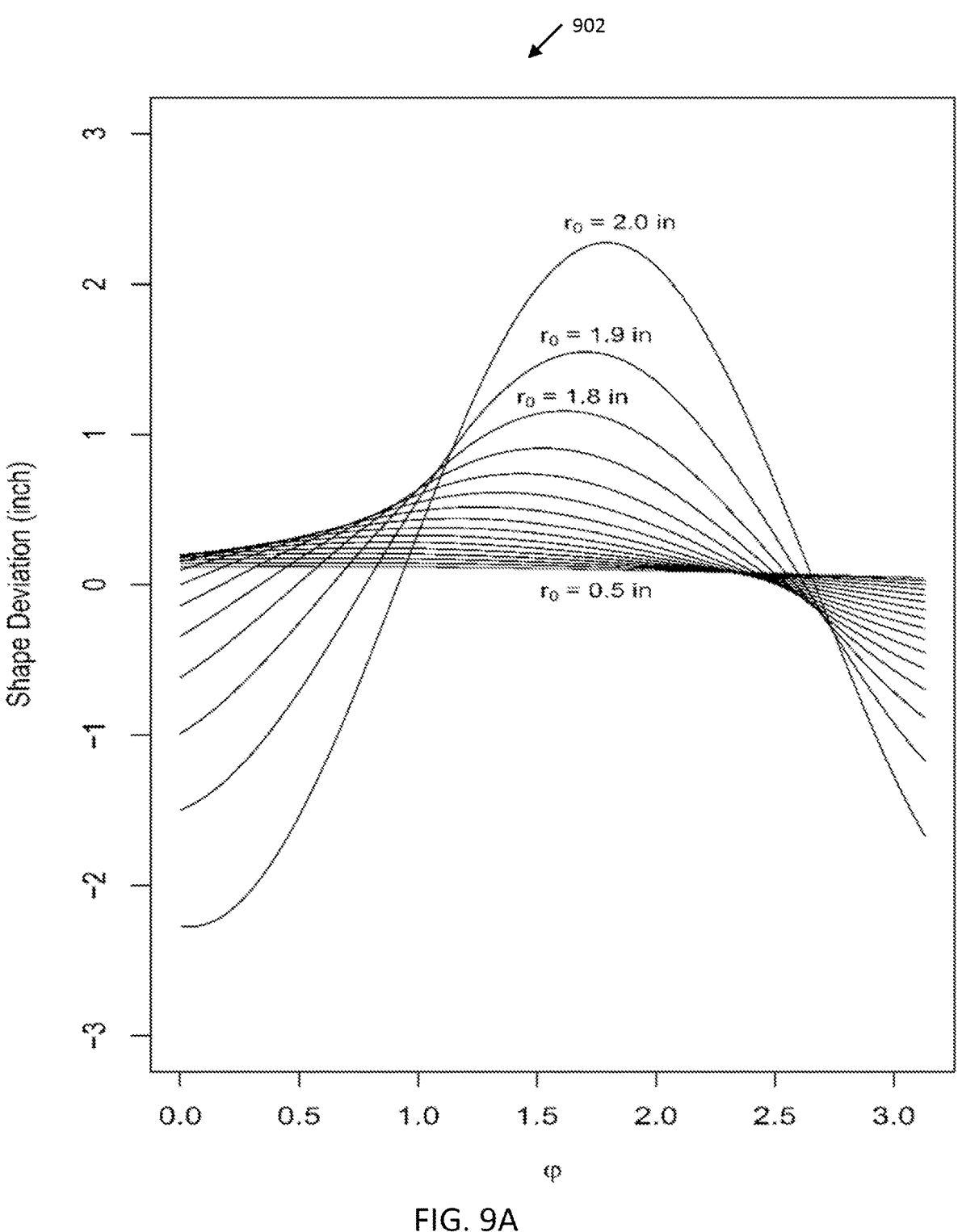
FIGS. 9A-F illustrate a series of graphs relating $\varphi$ with shape deviation for disk-shaped objects having different diameters, in accordance with various embodiments.
Figure 9B:
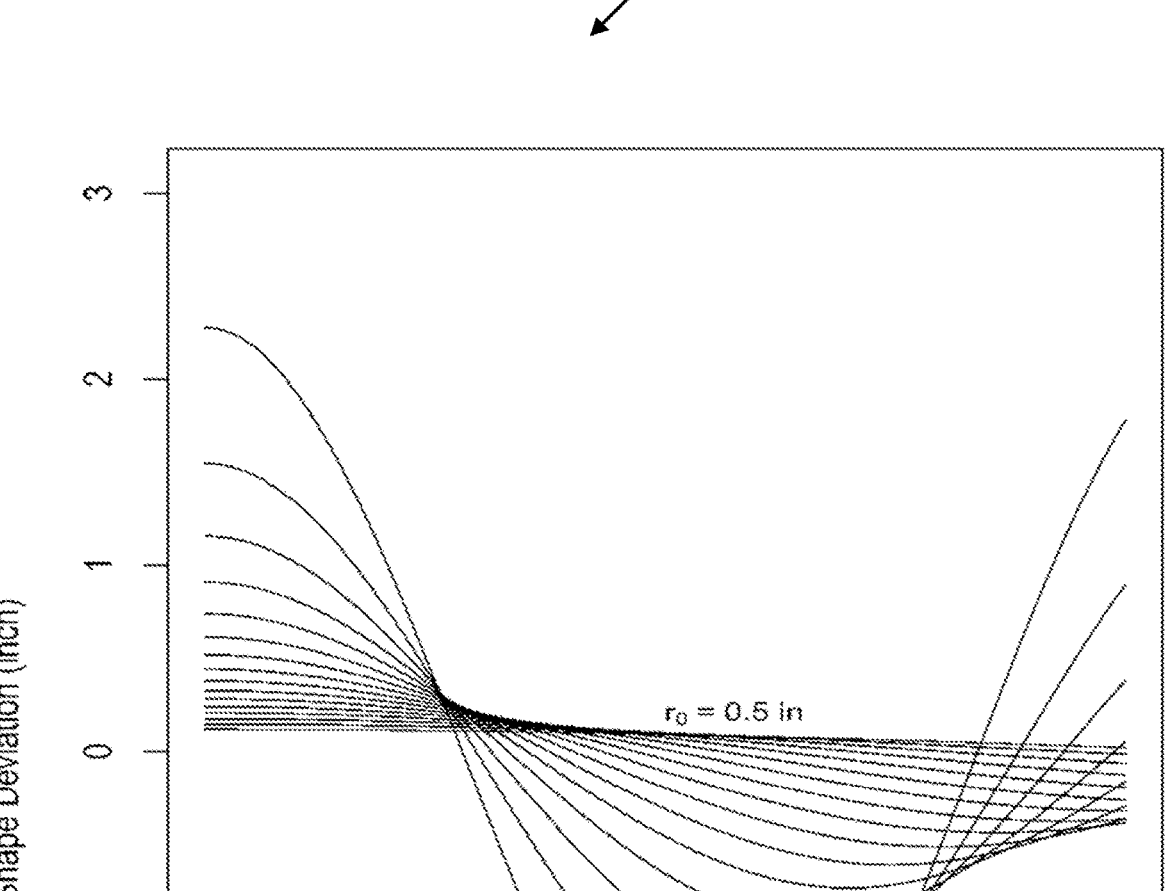
Figure 9C:
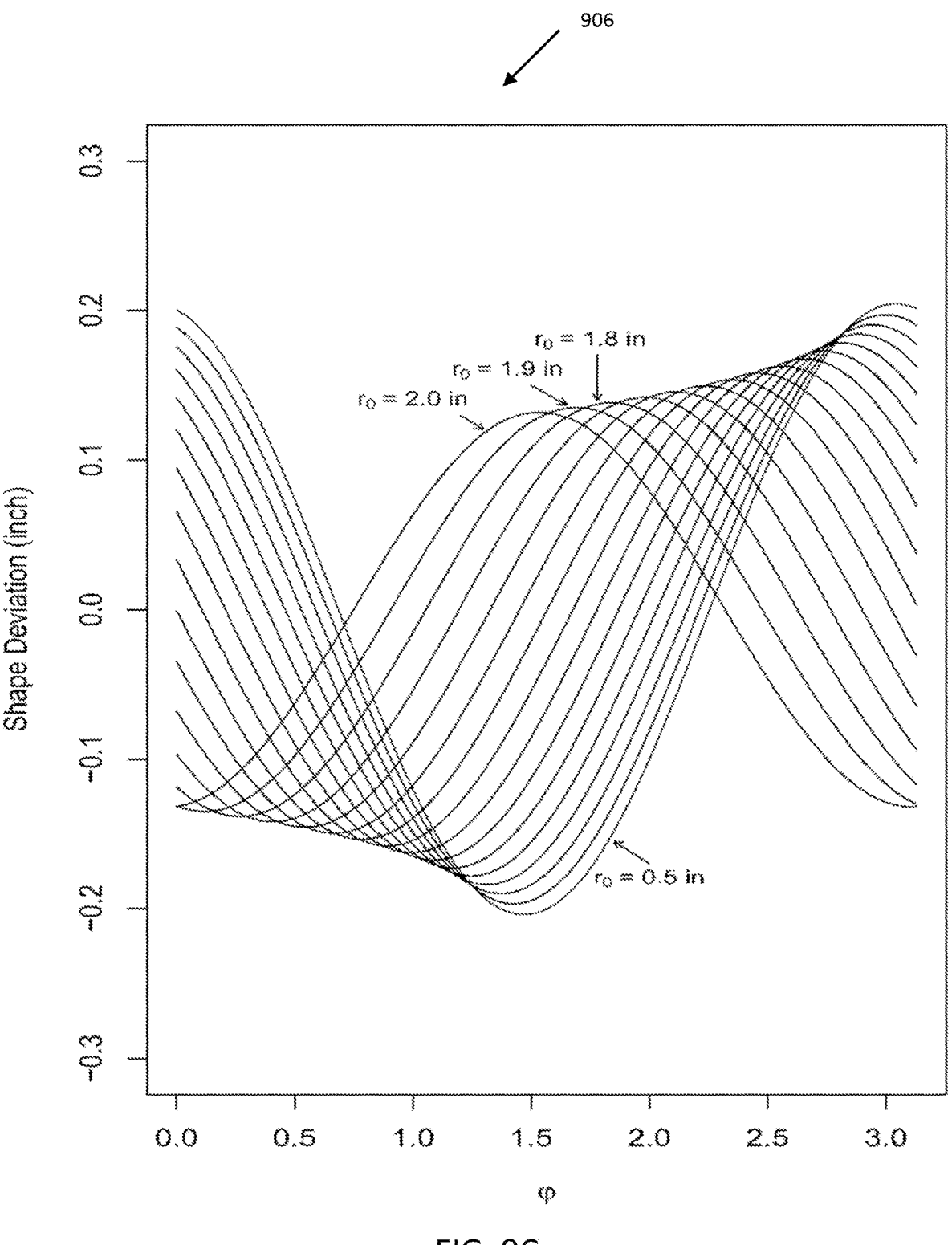
Figure 9D:
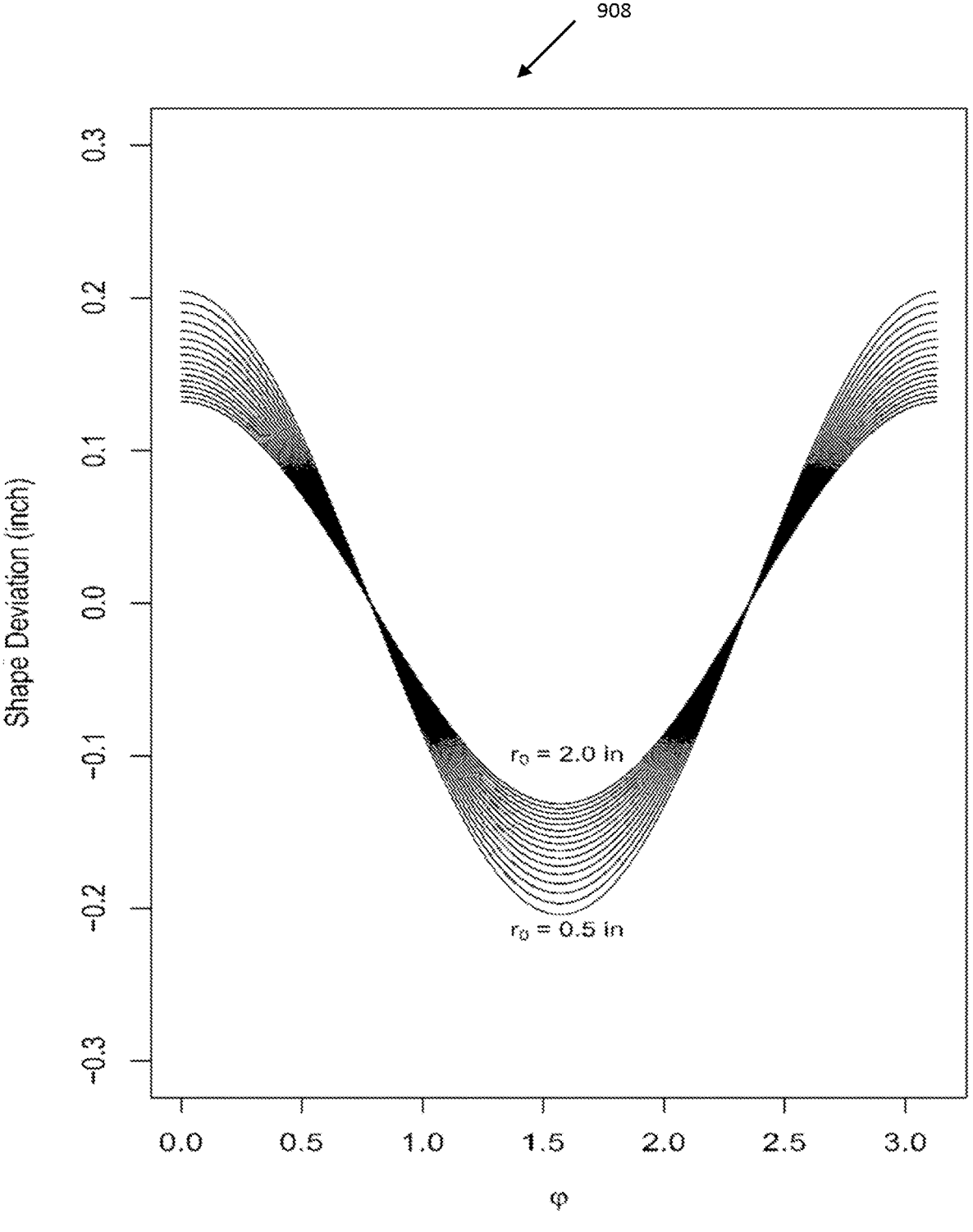
Figure 9E:
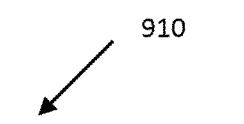
Figure 9F:
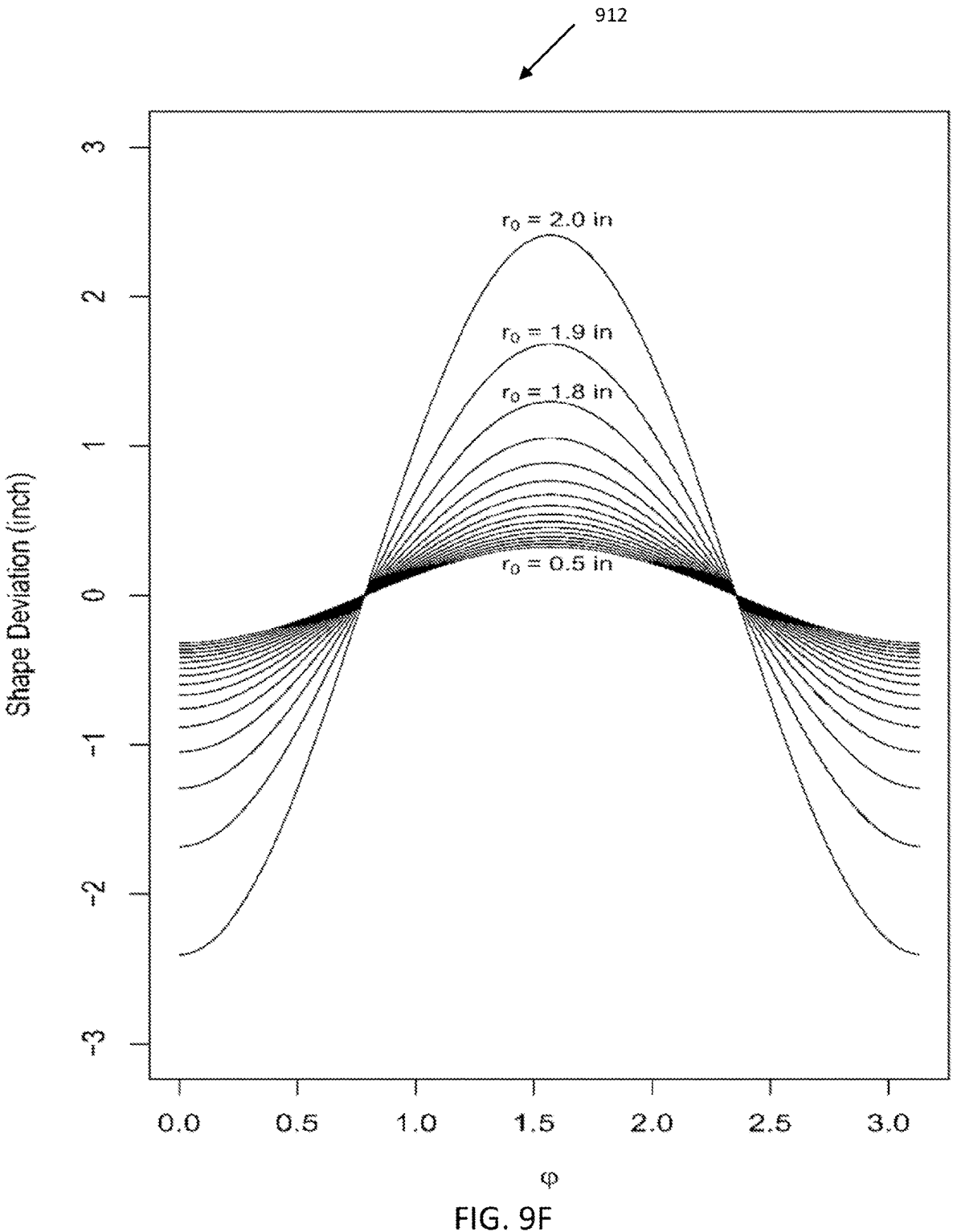

Moreover, FIG. 9A depicts a graph 902 relating $\varphi$ with shape deviation in inches for different values of $r_0$ for $h_1$ and a FIG. 9B depicts graph 904 relating $\varphi$ with shape deviation in inches for different values of $r_0$ with $\psi_{r_0}=0$ for $h_1$. FIG. 9C depicts a graph 906 relating $\varphi$ with shape deviation in inches for different values of $r_0$ for $h_2$ and FIG. 9D depicts a graph 908 relating $\varphi$ with shape deviation in inches for different values of $r_0$ with $\psi_{r_0}=0$ for $h_2$. FIG. 9E depicts a graph 910 relating $\varphi$ with shape deviation in inches for different values of $r_0$ for $h_3$ and FIG. 9F depicts a graph 912 relating $\varphi$ with shape deviation in inches for different values of $r_0$ with with $\psi_{r_0}=0$ for $h_3$.

One may appreciate that FIGS. 8, and 9A-F illustrate multiple process insights for vertically-built disks. For instance, with respect to $h_1$, one may appreciate that this term is the main descriptor of interlayer interaction effects. For instance, the term changes relatively sharply with radius, and the period of the term varies with radius as well. With respect to $h_2$, one may appreciate that this term is associated with gravity effects. For instance, FIGS. 9A-F reflects that it has less influence and its period does not change with radius or number of layers. Various other effects may be associated with this term. Finally, with respect to $h_3$, one may appreciate that this term is associated with the effect of shape deviation for the same shape built horizontally. In other words, this term may be primarily determined by $f(x)$. For instance, it shares a same period with $f(x)$ and same base function, $\cos(2\varphi)$. Further, the larger shape deviations are in the horizontal plane, the greater the influence on a same shape built vertically.

In various embodiments, the third updated SGD model determination may be further augmented. For example, the third updated SGD model determination may be augmented with a gaussian process regression to generate a GPR-augmented final SDG model (block 35816). A GPR-augmented final SDG model comprises the third updated SDG model further improved through gaussian process regression. Gaussian process regression is a nonparametric regression technique. For instance, the error term E associated with the equations discussed herein may be assumed to be noise. However, spatial correlations among shape deviations indicate that a model of residual shape deviations may be developed and applied to enhance modeling accuracy. For instance, in various instances, $\epsilon$ may be modeled as:

$$\epsilon = GP(0, k(.,.)) + \epsilon' \qquad \text{Eq. (26)}$$

$GP(0, K(.,.))$ is a Gaussian process with kernel function $k(.,.)$ and $\epsilon' \sim N(0, \sigma^2)$. The kernel function adopted in this implementation is the squared exponential kernel, though other kernels may be contemplated. For instance, the kernel function may comprise:

$$k(x, x') = \tau_f^2 \exp\left(-\frac{1}{2\tau_1^2} \|x - x'\|^2\right) \qquad \text{Eq. (27)}$$

with x being angle $\varphi$ in the modeling of vertically printed half-disks.

Extension to 3D Models

Attention is directed to FIGS. 2, 3A, 3B, and 3C for a more detailed discussion of various processes executed by the transfer function engine 210 in connection with a method 300 and related aspects of a model-informed estimation approach 350 to determining a transfer function.

Having discussed a variety of half-disk shapes and modeling associated therewith, in further embodiments, the model-informed estimation approach 350 may be implemented for determining transfer functions for 3D shapes as well and associated 3D models. For instance, in various embodiments, a transfer function g(x) and layer function is determined for 3D objects (block 352), SGD models are estimated for the 3D objects (block 356) and an subsequent physics-informed sequential model refinement routine is executed (block 358). Thus, a similar model-informed estimation approach 350 is performed. One may again appreciate that approach 350 further corresponds to an element of block 310 of FIG. 3A, which is executed by the transfer function engine 210 of FIG. 2. Moreover, various discussions and reference to blocks of figures is truncated herein below for brevity, however, one may appreciate that aspects of the preceding discussion, from time to time, apply or that discussions below are with reference to blocks from figures identified above.

An SDG model may be estimated (block 356) for a 3D object, such as a dome. For instance, an SDG model for general 3D shapes corresponds to a following form:

$$y(r_0(\theta, \varphi), \theta, \varphi) = (f * g)(r_0(\theta, \varphi), \theta, \varphi) + \epsilon = \qquad \text{Eq. (28)}$$
$$\int_{\tau 2}\int_{\tau 1} f(\tau_1, \tau_2) g(\theta - \tau_1, \varphi - \tau_2) d\tau_1 d\tau_2 + GP(0, k(.\ ,.)) + \epsilon'$$

where $GP(0, k(.,.))$ is a 2D gaussian process and $\epsilon' \sim N(0, \sigma_{\epsilon}^2)$.

More specifically, an SDG model for a 3D dome shape corresponds to the following form:

$$y(r_0, \theta, \varphi) = \alpha(r_0) h(r_0, \theta, \varphi) + \beta(r_0) + \epsilon = \qquad \text{Eq. (29)}$$
$$\alpha(r_0)\int_{\tau 2}\int_{\tau 1} f(\tau_1, \tau_2) g(\theta - \tau_1, \varphi - \tau_2) d\tau_1 d\tau_2 +$$
$$\beta(r_0) + GP(0, k(.\ ,.)) + \epsilon'$$

In various embodiments, in such a formulation, $f(\theta, \varphi)$ and $g(\theta, \varphi)$ are both normalized basis functions. Consequently, detailed discussion of block 352 is omitted and attention directed to the earlier discussions. Moreover, the SDG model for dome shapes contains the SDG model for 2D half disks discussed previously in Eq. 20. The Eq. 20 model can be viewed as a special case of the model presented in Eq. 29 above with $$\theta = \frac{\pi}{2} \text{ and } \theta = \frac{3\pi}{2}.$$

The transfer function $g(\theta, \varphi)$ can be viewed as $g(\theta, \varphi) = \delta_{\theta = \pi/2} g(\varphi)$ and when it convolves with $f(\theta, \varphi)$ in the convolution integral $h(r_0, \theta, \varphi)$, the 3D model degernates into a 2D model. With the result in Eq. (6) $(f(x) = (f*\delta)(x))$, one may appreciate that $f(\theta, \varphi)$ in Eq. (29) represents a shape deviation of horizontal disks at $\varphi$, without interlayer interaction effects. The effect of $\varphi$ appears on the layer radius (e.g., $r_0 \sin(\varphi)$. Combining with the in-plane deviation basis function cos $(2\theta)$ used previously, $f(\theta, \varphi)$ in Eq. (29) may be proposed as follows, where $\sin(\varphi)$ reflects an effect of radius change along the build direction:

$$f(\theta, \varphi) = \cos(2\theta)\sin(\varphi) \qquad \text{Eq. (30)}$$

Moreover, and in connection with developing a model, a transfer function is developed. In various instances, a transfer function is identified through deconvolution and model selection via LASSO. For example, a deconvolution problem is to identify $g(\theta, \varphi)$ given $f(\theta, \varphi)$ and measurement data $y(r_0, \theta, \varphi)$. Following a similar rationale as discussed for 2D transfer functions above, a 3D transfer function may be expressed as a combination of 2D Fourier bases. More specifically, a 3D transfer function may be expressed as:

$$g(\theta, \varphi) = \sum_{n=0}^{\infty}\sum_{m=0}^{\infty} c_{n,m}\cos(n\theta + \psi_n)\cos(m\varphi + \omega_m) \qquad \text{Eq. (31)}$$

For this function, $n(r_0)$ and $m(r_0)$ determine the periods along $\theta$ and $\varphi$, respectively. $\psi_n$ and $\omega_m$ are phase variables. Furthermore, $g(\theta,\varphi)$ likely has a sparce representation with features selected from large 2D Fourier bases. Among different regularization methods, LASSO may be adopted, though other methods are contemplated. In various embodiments, LASSO is adopted because it not only reduces model variances but also makes the model more interpretable with sparce solutions. Different regularization terms maybe added depending on applications. For instance, data could be decomposed into low-rank normal, sporadic, and noise such as by adopting the nuclear norm, L1-norm, and Frobenius norm, respectively.

Let $g_j$ denote the $j^{th}$ Fourier base with coefficient $c_j$ for $f*g_j$. For each dome, feature screening proceeds through the LASSO formulation where N represents a total number of sampled points on each dome:

$$\min_{C} \frac{1}{N} \sum_{i=1}^{N} \left( y_i - \sum_j c_j f*g_j(\theta_i, \varphi_i)^2 + \gamma\|C\|_1 \right) \qquad \text{Eq. (32)}$$

Four domes with radii of 0.5", 0.8", 1.5", and 1.8" are manufactured in an SLA process. The measurement data of dome shape deviation is presented in an SCS format, with 0.5", 0.8", and ⅛" domes regarded as a training set, and a 1.5" dome regarded for model validation. Similar to the phenomena described for 2D objects, the deviation pattern varies with size due to accumulated errors and differing interlayer interactions.

Significant terms shared across different domes may be selected. For instance, a resulting set of features (e.g., Fourier bases) may include: $\cos(n_1\theta+\psi_1)$, $\cos(n_2\varphi+\psi_2)$, and $\cos(n_1\theta+\psi_1)\cos(n_2\varphi+\psi_2)$.

A MLE refinement of transfer function g for individual domes may be performed. Thus, one may appreciate that block 358 and the corresponding process of FIG. 3C may be truncated, and/or estimations performed in differing sequences for differing models. For instance, in various instances, the following form is adopted for g, where $n_1$ and $n_2$ determine the periods along $\theta$ and $\varphi$, respectively and $\psi$ is a phase variable:

$$g(\theta,\varphi)=\cos(n_1\varphi)[1+\cos(n_2\theta+\psi)] \qquad \text{Eq. (33)}$$

Interestingly, the transfer function is determined not only by the height of layers [defined by $\cos(n_1\varphi)$] but also by its interaction with shape deviation within that layer [defined by $\cos(n_2\varphi+\psi_2)$]. With the transfer function identified in Eq. (33), the convolution integral in Eq. (29) becomes:

$$h(r_0, \varphi) = \frac{\cos(\varphi) - \cos(n_1\varphi)}{2(n_1^2 - 1)}\left[ \frac{1}{n_2 + 2}\sin(2\theta - \psi) - \right. \qquad \text{Eq. (34)}$$
$$\left. \frac{1}{n_2 - 2}\sin(2\theta + \psi) + \frac{2n_2}{n_2^2 - 4}\sin(n_2\theta + \psi) + \sin(2\theta) \right]$$

Finally, SDG model determination may proceed similarly to that of the discussion for 2D models. For instance, to obtain one unified SDG model for training shapes, a similar physics-informed sequential model refinement process similar to that of block 358 may be implemented. Following the similar process, the data suggest models for the following parameters: 1) $\alpha(r_0)=\alpha_1+\alpha_2 r_0$, 2) $\beta(r_0)=\beta_1+\beta_2 r_0$, 4) $n(r_0)=n_1+n_2 r_0$, 4) $n_2$ and $\psi$ are the unknown constraints.

With the training set (three domes), Table VI gives the initial MLE of the SDG model without considering the Gaussian process, i.e., $(\alpha_1+\alpha_2 r_0)h(r_0,\theta,\varphi)+(b_1+b_2 r_0)+\epsilon$.

TABLE VI

| Initial MLE Estimation Without the Gaussian Process Model Term | | |
| --- | --- | --- |
| Parameters | Estimate | Standard Error |
| $n_2$ | 0.3319 | 0.00155 |
| $\psi$ | 3.3897 | 0.00162 |
| $\alpha_1$ | −0.1137 | 0.00237 |
| $\alpha_2$ | −0.1683 | 0.00210 |
| $b_1$ | 0.0082 | 0.00008 |
| $b_2$ | 0.0062 | 0.00007 |
| $c_1$ | 0.0551 | 0.05747 |
| $c_2$ | −0.0324 | 0.04382 |
| $\sigma_E$ | 0.0046 | 0.00002 |

In various embodiments, a GPR-augmented final SDG model may be developed. A GPR-augmented final SDG model comprises the final 3D SDG model further improved through gaussian process regression. Gaussian process regression is a nonparametric regression technique. For instance, the error term $\epsilon$ associated with the equations discussed herein may be assumed to be noise. However, spatial correlations among shape deviations indicate that a model of residual shape deviations may be developed and applied to enhance modeling accuracy. For instance, in various instances, $\epsilon$ may be modeled as: $\epsilon=GP(0, k(.,.))+\epsilon'$. In various instances, the spatial correlation in model residuals is more critical for 3D shapes. With the squared exponential kernel function, the GPR of dome model residuals is conducted with optimized parameter estimates $\tau_f=0.0097$, $\tau_1=0.9886$, and $\sigma_{\epsilon'}=0.0029$. The length scale $\tau_1=0.9886$ suggests that the predicted values of the Gaussian process vary moderately in the area $[0, 2\pi]\times[0,\pi/2]$. The scaling factor $\tau_f=0.0097$ is significantly larger than the residual standard deviation $\sigma_{\epsilon'}=0.0029$, which indicates that the spatial correlation and variation are significant for 3D shapes.

The root-mean-square errors (RMSes) of the training set and validation set are 0.0036361" and 0.0036379", respectively, and the mean absolute errors (MAEs) for the two sets are 0.002636" and 0.002367" for the training and validation sets, respectively.

Various process insights are available from the SDG model for domes. For instance, the four terms in $h(r_0,\theta,\varphi)$ may be defined and analyzed as:

$$h_0(r_0, \varphi) = \frac{\cos(\varphi) - \cos[n_1(r_0)\varphi]}{2(n_1(r_0)^2 - 1)} \qquad \text{Eq. (35)}$$

$$h_1(r_0, \varphi) = \frac{1}{n_2 + 2}\sin(2\theta - \psi) - \frac{1}{n_2 - 2}\sin(2\theta + \psi) \qquad \text{Eq. (36)}$$

$$h_2(\theta) = \frac{2n_2}{n_2^2 - 4}\sin(n_2\theta + \psi) \qquad \text{Eq. (37)}$$

$$h_3(\theta) = \sin(2\theta) \qquad \text{Eq. (38)}$$

Figure 10:
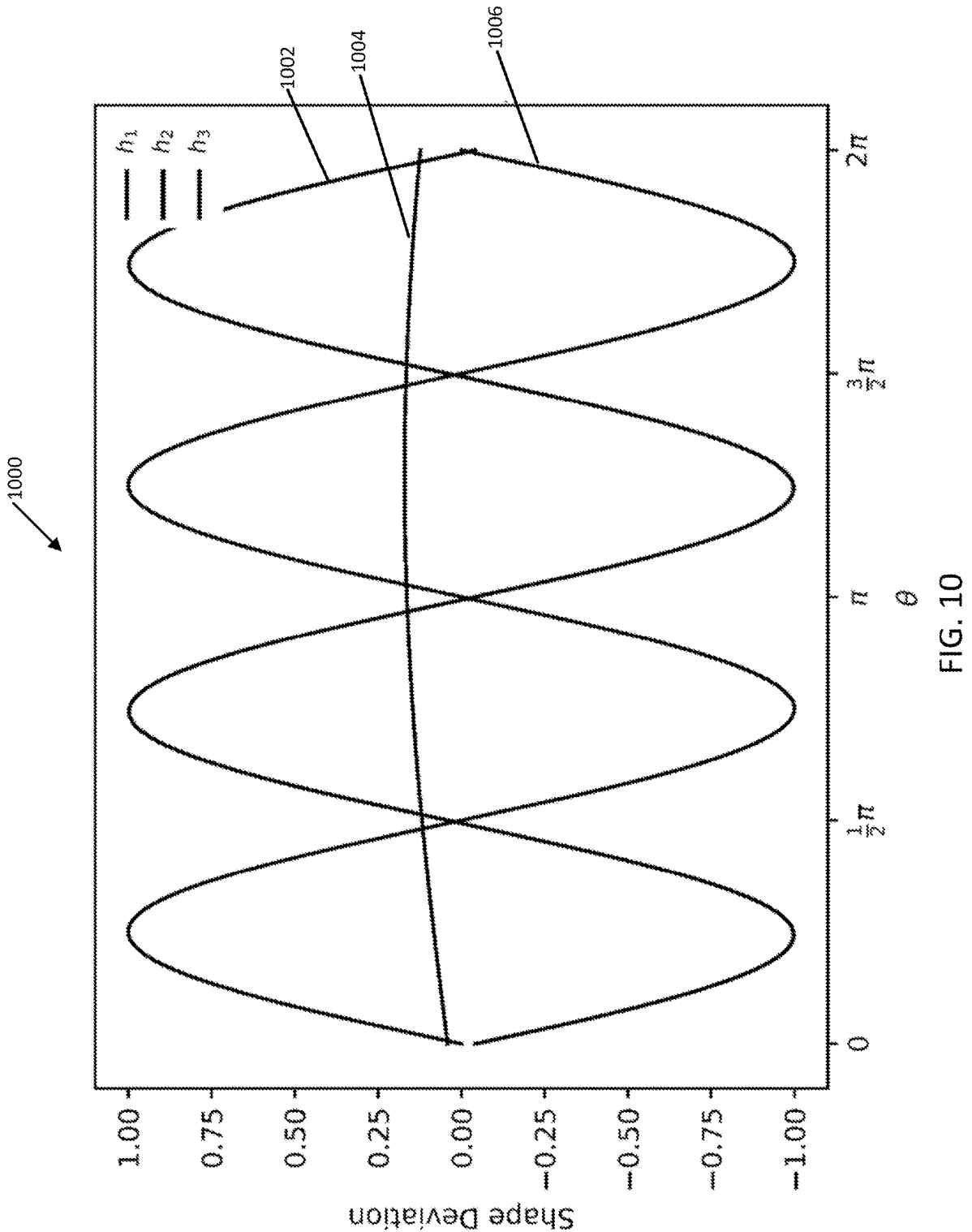
FIG. 10 illustrates different shape deviations for dome-shaped objects having different diameters, in accordance with various embodiments.
Figure 11:
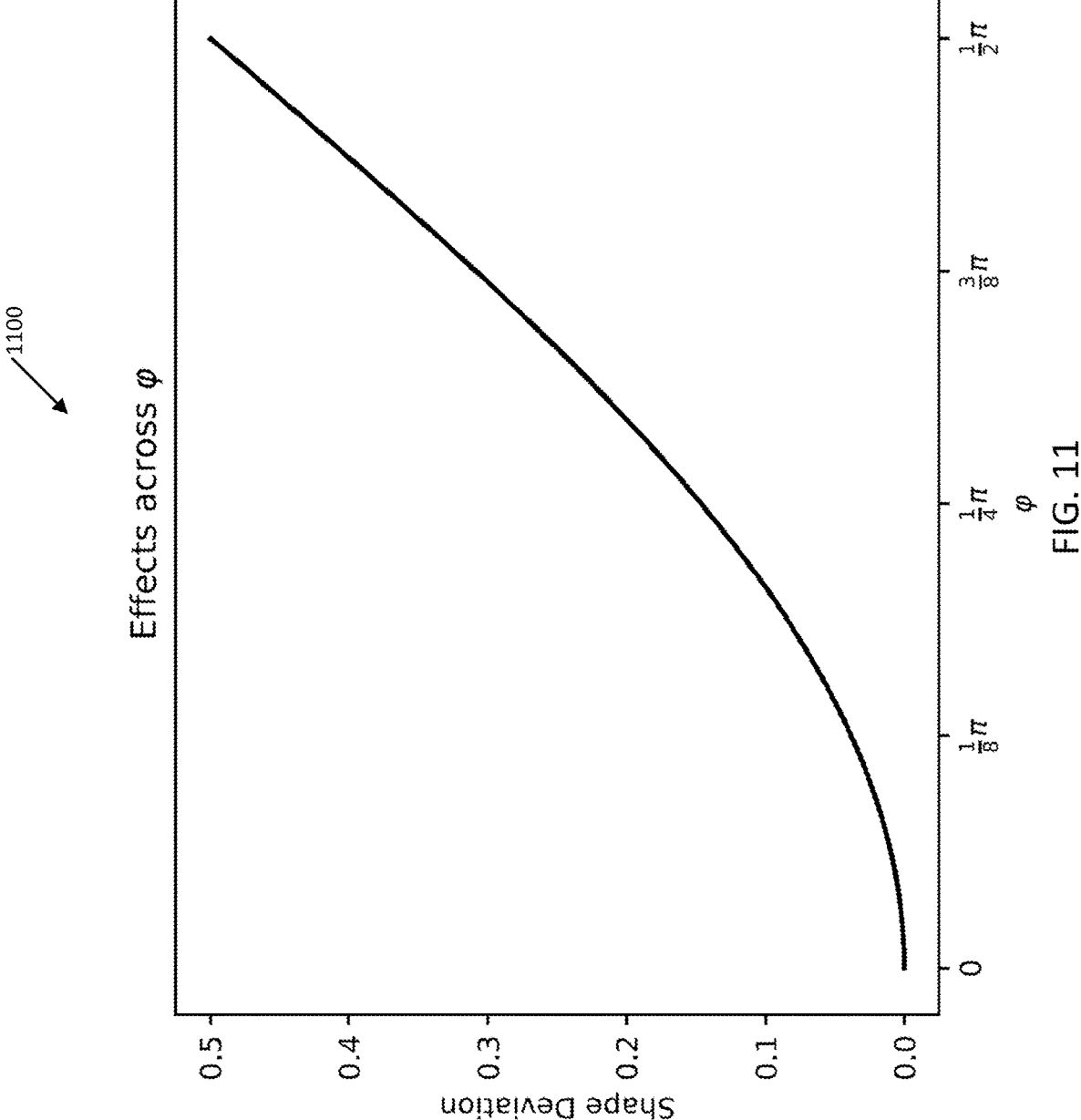
FIG. 11 illustrates a graph showing shape deviations vs height for various dome-shaped objects, in accordance with various embodiments.

Consequently: $h(r_0,\theta,\varphi)=h_0(r_0,\varphi)[h_1(\theta)+h_2(\theta)+h_3(\theta)]$ One may appreciate that the term $h_0(r_0,\varphi)$ is decided by $r_0$ and $\varphi$, while the other three terms only depend on $\theta$. Directing attention to FIG. 10, a graph 1000 is depicted plotting $h_{1,2,3}(\theta)$. A first line 1002 represents $h_1(\theta)$, a second line 1004 represents $h_2(\theta)$, and a third line 1006 represents $h_3(\theta)$. Three functions $h_{1,2,3}(\theta)$ have a same interpretation as those in the 2D half-disk case, that is, they represent interlayer interaction effects, a gravity effect, and an effect of input in-plane shape deviations, respectively. In various instances, $h_3(\theta)$ is not due to the interaction effect because it is the result of convolving in-plane deviation pattern $\cos(2\theta)$ in $f(\theta,\varphi)$ with the constant in $g(r_0,\theta,\varphi)=\cos(n_1(r_0)\varphi)[1+\cos(n_2\theta+\psi)]$. Note the separation of $\theta$ and $\varphi$. One difference from the half-disk case is that all three effects will be influenced by the height of the layer defined by $\varphi$. For instance, and with reference to FIG. 11, $h_0(r_0,\varphi)$ is plotted in a graph 1100, which interestingly, shows that the function values are almost the same for different values of $r_0$, for instance, $r_0=0.5"$ to $r_0=1.8"$. Finally, combining the term $h_0$ with $h_{1,2,3}$ respectively, one may consider the interlayer interaction effect, the gravity effect, and the input in-plane shape effect. The interpretation is consistent with the case for 2D half-discs.

The SDG developed in this work provides a data-analytical framework to learn geometric measurement data of AM built products. Under a convolution framework, SDG enables a consistent description of 3-D shape formation in layer-by-layer fabrication processes, from horizontally built disks, vertically built disks, to fully 3-D domes. This is achieved through proper representation of shape deviation data, modeling of individual layer input, and transfer function derived to capture the interlayer interactions. The physics-informed sequential model determination and refinement strategy leads to efficient learning and a better understanding of process insights. Effects due to interlayer interactions, gravity, and deviation of individual layers are separated for guiding further experimentation and validation. Though the initial methodology demonstration applies to simple shapes, such as disks and domes, the convolution framework allows input functions ($f$) to take complicated geometries for each layer and to convolute with the transfer function (g) to form complicated 3-D shapes.

Returning reference again to FIG. 2, the system 100 may include a machine control supervisor 212. A machine control supervisor may comprise a logical aspect of a processor and/or memory configured to prepare machine control instructions for transmission to an additive manufacturing machine. The machine control supervisor 212 may transmit instructions directing the movement of machine parts and the emplacement of manufacturing material corresponding to a construction of an additively manufactured object. In various embodiments, the machine control supervisor 212 further receives machine control instructions from other system aspects communicating with the bus 214, provides these instructions to the input representation determiner 202 as the first data and then further transmits machine control instructions to other system aspects communicating with the bus 214 that have been changed based on the transfer function developed by the transfer function engine 210. For instance, the machine control supervisor may generate machine instructions for an additive manufacturing machine corresponding to the first input data that is offset according to the transfer function in order to cancel the shape deviation (s) from the electronic model, causing the additively manufactured object to be manufactured without the shape deviations that otherwise would occur. For instance, a transfer function according to an SGD model (such as a third updated SGD model) determination with a gaussian process regression may be implemented.

Exemplary embodiments of the systems, apparatuses, and methods have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

The terms "computer program medium" and "computer usable medium" and "computer readable medium" are used to generally refer to media such as removable storage drive and a hard disk installed in hard disk drive. These computer program products provide software to computer system. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

What is claimed is:

1. A method for predicting geometric shape accuracy of 3D printed products, the method comprising:
   determining an input representation of an object in response to first input data;
   generating an electronic model of the object in response to the input representation;
   predicting a shape deviation of the electronic model relative to the input representation of the object;
   determining at least one layer function to define at least one layer of the electronic model of the object;
   calculating a convolution transfer function that when convolved with the at least one layer function generates the at least one shape deviation of the electronic model, the at least one shape deviation comprising a whole shape deviation of all layers of the at least one layer of the electronic model of the object and comprising a feature error comprising a distortion of a specific geometric feature of the at least one layer of the electronic model of the object, wherein convolving of the convolution transfer function includes data representative of a state vector of the at least one layer and a system response combined in the convolution transfer function;
   convolving the convolution transfer function with the at least one layer function to generate the at least one shape deviation; and
   generating machine control instructions for an additive manufacturing machine corresponding to the first input data offset according to the convolution transfer function to cancel the at least one shape deviation from the electronic model.

2. The method of claim 1, wherein the electronic model of the object includes a combination of primitive shapes.

3. The method of claim 1, further including learning the convolution transfer function using machine learning techniques.

4. The method of claim 1, wherein the convolution transfer function is learned using functional bases, including Fourier bases.

5. The method of claim 1, wherein calculating the convolution transfer function includes applying a model-informed estimation approach wherein an initially determined model is refined by a maximum likelihood estimation corresponding to a length of interaction window interrelating at least two layers of the electronic model of the object.

6. The method of claim 1, wherein calculating the convolution transfer function further executing a gaussian process regression (GPR) to generate a GPR-augmented electronic model of the object.

7. A system for predicting geometric shape accuracy of 3D printed products, the system comprising:

a non-transitory computer-readable memory configured to store instructions; and one or more processor configured to:

determine an input representation of an object in response to first input data;

generate an electronic model of the object in response to the input representation;

predict a shape deviation of the electronic model relative to the input representation of the object;

determine at least one layer function to define at least one layer of the electronic model of the object; and calculate a convolution transfer function that when convolved with the at least one layer functions generates the at least one shape deviation of the electronic model.

8. The system of claim 7, wherein the one or more processor is further configured to generate machine control instructions for an additive manufacturing machine corresponding to the first input data, offset according to the convolution transfer function, to cancel the at least one shape deviation from the electronic model.

9. The system of claim 7, wherein the electronic model of the object includes a combination of primitive shapes.

10. The system of claim 7, wherein the one or more processor is configured to learn the convolution transfer function using machine learning techniques.

11. The system of claim 7, wherein the one or more processor is configured to learn the convolution transfer function using Fourier bases.

12. The system of claim 7, wherein the one or more processor that is configured to calculate the convolution transfer function is further configured to apply a model-informed estimation approach wherein an initially determined model is refined by a maximum likelihood estimation corresponding to a length of interaction window interrelating at least two layers of the electronic model of the object.

13. The system of claim 7, wherein the one or more processor that is configured to calculate the convolution transfer function is further configured to executing a gaussian process regression (GPR) to generate a GPR-augmented electronic model of the object.

14. A non-transitory computer readable medium containing program instructions for causing a computer to perform the method comprising:

determining an input representation of an object in response to first input data;

generating an electronic model of the object in response to the input representation;

predicting a shape deviation of the electronic model relative to the input representation of the object;

determining at least one layer function to define at least one layer of the electronic model of the object; and calculating a convolution transfer function that when convolved with the at least one layer function generates the at least one shape deviation of the electronic model.

15. The non-transitory computer readable medium of claim 14, wherein the method further includes generating machine control instructions for an additive manufacturing machine corresponding to the first input data offset according to the convolution transfer function to cancel the at least one shape deviation from the electronic model.

16. The non-transitory computer readable medium of claim 14, wherein the electronic model of the object includes a combination of primitive shapes.

17. The non-transitory computer readable medium of claim 14, wherein the method further includes learning the convolution transfer function using machine learning techniques.

18. The non-transitory computer readable medium of claim 14, wherein the convolution transfer function is learned using functional bases, including Fourier bases.

19. The non-transitory computer readable medium of claim 14, wherein the calculating the convolution transfer function includes applying a model-informed estimation approach wherein an initially determined model is refined by a maximum likelihood estimation corresponding to a length of interaction window interrelating at least two layers of the electronic model of the object.

* * * * *